(12) United States Patent
Goto

(10) Patent No.: US 8,308,314 B2
(45) Date of Patent: Nov. 13, 2012

(54) SURFACE LIGHT SOURCE SYSTEM AND LIGHT SOURCE UNIT

(75) Inventor: Masahiro Goto, Mihara (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 779 days.

(21) Appl. No.: 12/278,988

(22) PCT Filed: Feb. 15, 2007

(86) PCT No.: PCT/JP2007/052765
§ 371 (c)(1),
(2), (4) Date: Aug. 11, 2008

(87) PCT Pub. No.: WO2007/094426
PCT Pub. Date: Aug. 23, 2007

(65) Prior Publication Data
US 2009/0091919 A1    Apr. 9, 2009

(30) Foreign Application Priority Data

Feb. 15, 2006   (JP) .................................. 2006-037717
Feb. 15, 2006   (JP) .................................. 2006-038360

(51) Int. Cl.
*G02F 1/13357* (2006.01)
(52) U.S. Cl. ....................... 362/97.3; 362/97.4; 362/612
(58) Field of Classification Search ........ 362/97.1–97.4, 362/612, 613, 223
See application file for complete search history.

(56) References Cited

U.S. PATENT DOCUMENTS

| | | | |
|---|---|---|---|
| 5,592,332 A * | 1/1997 | Nishio et al. ................... | 359/619 |
| 5,808,784 A | 9/1998 | Ando et al. | |
| 6,069,676 A | 5/2000 | Yuyama | |
| 6,876,408 B2 | 4/2005 | Yamaguchi | |
| 7,052,152 B2 | 5/2006 | Harbers et al. | |
| 2004/0129946 A1 | 7/2004 | Nagai et al. | |
| 2005/0046767 A1* | 3/2005 | Freking et al. ................... | 349/62 |
| 2005/0243551 A1 | 11/2005 | Onishi et al. | |
| 2005/0270654 A1 | 12/2005 | Goto et al. | |
| 2006/0002151 A1 | 1/2006 | Park | |
| 2007/0014098 A1* | 1/2007 | Park et al. ....................... | 362/29 |

FOREIGN PATENT DOCUMENTS

CN    1683974 A1    10/2005

(Continued)

OTHER PUBLICATIONS

KR 10-2005-0063925.*

*Primary Examiner* — Jong-Suk (James) Lee
*Assistant Examiner* — Leah S Macchiarolo
(74) *Attorney, Agent, or Firm* — Burr & Brown

(57) ABSTRACT

A surface light source system capable of emitting light without producing non-uniform luminance and non-uniform color distributions is provided. The surface light source system comprises a lenticular lens sheet having unit lenses with convexity on the light-exiting side, and a light source unit having emission sources of two types or more that are different in the wavelength range of light they emit. The unit lenses are arranged in one direction at approximately regular intervals. Emission sources of each type are arranged in the one direction at approximately regular intervals. The intervals at which the respective emission sources of two types or more arranged in the one direction are nearly the same in length.

16 Claims, 10 Drawing Sheets

FOREIGN PATENT DOCUMENTS

| | | |
|---|---|---|
| CN | 1716040 A1 | 1/2006 |
| JP | 05-119703 | 5/1993 |
| JP | 06-018707 | 1/1994 |
| JP | 07-005462 | 1/1995 |
| JP | 07-005463 A1 | 1/1995 |
| JP | 08-338901 | 12/1996 |
| JP | 10-049074 | 2/1998 |
| JP | 11-242219 | 9/1999 |
| JP | 2000-030521 | 1/2000 |
| JP | 2001-305306 A1 | 10/2001 |
| JP | 2004-140185 | 5/2004 |
| JP | 2005-115372 | 4/2005 |
| JP | 3114467 | 8/2005 |
| JP | 2005-316091 | 11/2005 |
| JP | 2005-326819 | 11/2005 |
| JP | 2006-018261 | 1/2006 |
| JP | 2007-012517 | 1/2007 |
| KR | 2006-0000977 A1 | 1/2006 |
| KR | 10-2005-0063925 A * | 1/2007 |

* cited by examiner

SURFACE LIGHT SOURCE SYSTEM AND LIGHT SOURCE UNIT

FIELD OF THE INVENTION

The present invention relates to a surface light source system to be used for illuminating a liquid crystal display or the like, and a light source unit to be incorporated in the surface light source system.

BACKGROUND OF THE INVENTION

Surface light source systems of various types, useful for illuminating transmission type liquid crystal displays and so on, have been proposed and put to practical use. Of the surface light source systems practically used now, some systems, such as those of edge light type or of direct type, use emission sources that do not emit light two-dimensionally or that do not emit light in a sheet formation.

In a surface light source system of direct type, emission sources that emit light linearly are arranged in parallel with each other, for example. In this surface light source system, cold cathode fluorescent tubes and a transmission type display element, such as an LCD (Liquid Crystal Display) panel, are spaced, as needed. Between the cold cathode fluorescent tubes and the transmission type display element are placed several optical sheets, such as a diffusion sheet for diffusing light and a sheet for collecting light substantially in one direction.

However, such a surface light source system is sometimes insufficient in the property of collecting light emitted from the emission sources, although the surface light source system includes many optical sheets. Therefore, an LCD panel to be used in combination with the surface light source system is sometimes improved such that even light obliquely entering the LCD panel can keep the image quality good. However, even if the LCD panel is so improved, optical efficiency cannot be satisfactorily increased, and, moreover, the structure of the LCD panel is complicated, so that the cost for producing a liquid crystal display increases.

Further, of the surface of the LCD panel that faces the surface light source system of direct type, those portions that are close to the emission sources (cold cathode fluorescent tubes) and those portions that are apart from the emission sources (i.e., those portions that face the parts between two adjacent emission sources) are different in light intensity (luminance), so that the surface of the LCD panel tends to have non-uniformity of light intensity (non-uniformity of luminance). Furthermore, light emitting diodes that emit light as point like are sometimes used as emission sources in these days. In the examples disclosed in Japanese Laid-Open Patent Publication No. 115372/2005, a light source unit is made by arranging light emitting diodes of red, green and blue, the three primary colors of light, on a plane. Point light sources arranged on a plane produce two-dimensionally non-uniform luminance. When emission sources that are different in the wavelength range of light they emit are used, the non-uniformity of color is brought about in addition to the non-uniformity of luminance.

By making the distance between the emission sources and the LCD panel greater, the surface of the LCD panel can be prevented from becoming non-uniform in luminance and in color. A greater distance between the emission sources and the LCD panel, however, brings about another problem that the display has an increased thickness. Similarly, the surface of the LCD panel can also be prevented from becoming non-uniform in luminance and in color by improving the light-diffusing properties of each optical sheet, or limiting the quantity of light each optical sheet transmits. These techniques, however, cause the problem that the efficiency of utilization of the light emitted from the emission sources decreases. Further, the surface light source systems disclosed in Japanese Laid-Open Patent Publications No. 119703/1993 and No. 242219/1999 use light-shielding members (lighting curtains, light-shielding dot layers) in order to prevent the surface of an LCD panel from becoming non-uniform in luminance and in color. This technique also causes the problem that the efficiency of utilization of the light emitted from the emission sources decreases.

The above emission sources consisting of light emitting diodes are sometimes supported on a printed circuit board. For example, in the case where the emission sources consisting of light emitting diodes are supported directly on a printed circuit board as in the surface light source system disclosed in Japanese Laid-Open Patent Publication No. 18261/2006, light from the emission sources partly reaches the printed circuit board. Since the light that has reached the printed circuit board is absorbed by the printed circuit board, the efficiency of utilization of the light emitted from the emission sources decreases.

Further, the printed circuit board is made using a glass epoxy resin, for example. The glass epoxy resin, however, has low thermal conductivity and is poor in heat-radiating characteristics. The heat of the emission sources, therefore, is not radiated, and the temperature of the emission sources rises. If the temperature of the emission sources consisting of light emitting diodes increases, there occur the problems that the light the light emitting diodes emit undergoes change in color and that the life of the light emitting diodes decreases.

SUMMARY OF THE INVENTION

In the light of the above-described problems in the prior art, the present invention was accomplished. An object of the present invention is to provide a surface light source system capable of emitting light without non-uniformity of luminance and that of color. Another object of the present invention is to provide a surface light source system improved in the efficiency of utilization of light emitted from emission sources, and a light source unit (a set of emission sources, light source part) to be incorporated in the surface light source system. A further object of the present invention is to provide a surface light source system excellent in heat radiation characteristics, and a light source unit (a set of emission sources, light source part) to be incorporated in the surface light source system.

A first surface light source system according to the present invention comprises: a first lenticular lens sheet having multiple unit lenses, each of the unit lenses projecting on the light-exiting side; a second lenticular lens sheet having multiple unit lenses, each of the unit lenses projecting on the light-exiting side; and a light source unit having emission sources, the emission sources being capable of being divided into two types or more according to wavelength ranges of light they emit, wherein the unit lenses in the first lenticular lens sheet are arranged in one direction parallel to a sheet plane of the first lenticular lens sheet at approximately regular intervals, wherein the unit lenses in the second lenticular lens sheet are arranged in other direction at approximately regular intervals, the other direction being parallel to a sheet plane of the second lenticular lens sheet and being perpendicular to the one direction, wherein the emission sources are arranged on a plane parallel to the sheet plane of the first lenticular lens sheet, wherein emission sources of each type are arranged in the one direction at approximately regular intervals, and wherein intervals at which respective emission sources of two types or more arranged in the one direction are nearly the same in length. According to such a surface light source system, the lenticular lens sheets can effectively prevent the surface of the system from becoming non-uniform in luminance and in color in at least one direction. The emission sources may substantially be point light sources. Light emitting diodes can be used as point light sources.

In the first surface light source system according to the present invention, the emission sources of each type may also be arranged in the other direction at approximately regular intervals.

Further, in the first surface light source system according to the present invention, a length L of the intervals at which the emission sources of each type are arranged in the one direction, a distance d between the light source unit and the first lenticular lens sheet, measured along a normal to the sheet plane of the first lenticular lens sheet, an angle θ between the normal and a tangent line to an edge, in the one direction, of the unit lenses in a cross section taken along the one direction and along the normal, and a refractive index n of a material for the unit lenses may be made to fulfill the following relationship:

$$\cos^{-1}(n \times \cos(\phi+\theta)) \leq \theta$$

wherein $\phi = \sin^{-1}(\sin(\tan^{-1}(L/2d))/n)$, or $$n \times \cos(\phi+\theta) \geq 1$$

wherein $\phi = \sin^{-1}(\sin(\tan^{-1}(L/2d))/n)$.

According to such a surface light source system, it can be secured that, from those portions of the surface light source system that face to the parts between the emission sources arranged in the one direction, light will be emitted in the direction along the normal to the surface light source system. Therefore, the surface of the surface light source system can be effectively prevented from becoming non-uniform in luminance and in color, and, moreover, the efficiency of utilization of the light emitted from the emission sources can also be increased.

Furthermore, in the first surface light source system according to the present invention, the light source unit may at least has first emission sources having a first emission center wavelength second emission sources having a second emission center wavelength, the second emission center wavelength being longer than the first emission center wavelength and third emission sources having a third emission center wavelength, the third emission center wavelength being longer than the second emission center wavelength; the first emission sources, the second emission sources or the third emission sources may be arranged in the one direction at approximately regular distances; the intervals at which the first multiple emission sources are arranged in the one direction, the intervals at which the second multiple emission sources are arranged in the one direction, and the intervals at which the third multiple emission sources arranged in the one direction may be nearly the same in length; and a shortest distance between two of the second multiple emission sources, measured along the sheet plane of the lenticular lens sheet, may be shorter than the intervals at which the second emission sources are arranged in the one direction.

Furthermore, in the first surface light source system according to the present invention, the light source unit may further has a substrate layer that supports the emission sources, and a reflecting layer formed on the same side of the substrate layer as the emission sources. According to such a surface light source system, light traveling towards the non-observer side (non-light-exiting side) can be reflected from the reflecting layer to the observer side, whereby the efficiency of utilization of the light emitted from the emission sources can be increased. In this light source unit (a set of emission sources, light source part), the reflecting layer may be formed such that the reflecting layer occupies 50% or more of a whole area of a surface that can be seen in the front view from one side. Alternatively, in this light source unit (a set of emission sources, light source part), the reflecting layer may be formed on the whole area of the surface that can be seen in the front view from the one side, excluding those portions of the surface that the emission sources occupy. The reflectance of the reflecting layer is preferably 85% or more, more preferably 90% or more. The reflecting layer may be formed such that the reflecting layer diffusely reflects light.

The first surface light source system according to the present invention may further comprise a diffusing sheet with a haze value of 50 or more, the diffusing sheet having fine irregularities on its light-exiting side, and the diffusing sheet may be placed on the light-exiting side of both the first lenticular lens sheet and the second lenticular lens sheet. According to such a surface light source system, the surface of the system can be more effectively prevented from becoming non-uniform in luminance and in color.

Furthermore, in the first surface light source system according to the present invention, the first lenticular lens sheet may have a scattering layer that scatters light; and the scattering layer may be formed such that the scattering layer extends along a contours of the unit lenses so as to form a light-exiting-side-surface of the first lenticular lens sheet. According to such a surface light source system, the surface of the system can be more effectively prevented from becoming non-uniform in luminance and in color. In such a surface light source system, a length p of the intervals at which the unit lenses in the first lenticular lens sheet are arranged in the one direction and a thickness t of the scattering layer may be made to fulfill the following relationship:

$$p/10 \leq t \leq p/3.$$

According to such a surface light source system, light that is totally reflected on the unit lenses and emerges from the unit lenses at great angles can be diffused and scattered, and can thus be attenuated.

Further, in the first surface light source system according to the present invention, in a cross section taken along a normal to the sheet plane of the first lenticular lens sheet and along the one direction, the unit lenses may be in the shape of a part of an ellipsoid whose major axis is in parallel with the normal; and a semimajor axis of the ellipsoid may not be less than 2.5 times and may not be more than 5 times a semiminor axis of the ellipsoid. According to such a surface light source system, the surface of the system can be more effectively prevented from becoming non-uniform in luminance and in color.

Further, in the first surface light source system according to the present invention, the emission sources of each type may also be arranged in the other direction at approximately regular intervals and intervals at which the respective emission sources of two types or more arranged in the other direction may be nearly the same in length. According to such a surface light source system, the first lenticular lens sheet can more effectively prevent the surface of the system from becoming non-uniform in luminance and in color in the one direction, and, at the same time, the second lenticular lens sheet can effectively prevent the surface of the system from becoming non-uniform in luminance and in color in the other direction. In such a surface light source system, a length L of the intervals at which the emission sources of each type are arranged in the one direction, a distance d between the light source unit and the first lenticular lens sheet, measured along a normal to the sheet plane of the first lenticular lens sheet, an angle θ between the normal and a tangent line to an edge, in the one direction, of the unit lenses in a cross section taken along the one direction and along the normal, and a refractive index n of a material for the unit lenses may be made to fulfill the following relationship:

$$\cos^{-1}(n \times \cos(\phi+\theta)) \leq \theta$$

wherein $\phi = \sin^{-1}(\sin(\tan^{-1}(L/2d))/n)$, or $$n \times \cos(\phi+\theta) > 1$$

wherein $\phi = \sin^{-1}(\sin(\tan^{-1}(L/2d))/n)$;

and, at the same time, a length $L_2$ of the intervals at which the emission sources of each type are arranged in the other direction, a distance $d_2$ between the light source unit and the second lenticular lens sheet, measured along the normal to the sheet plane of the first lenticular lens sheet, and an angle $\theta_2$ between the normal and a tangent line to an edge, in other direction, of the unit lenses in the second lenticular lens sheet in a cross section taken along the other direction and along the normal, and a refractive index $n_2$ of a material for the unit lenses in the second lenticular lens sheet may be made to fulfill the following relationship:

$$\cos^{-1}(n_2 \times \cos(\phi_2+\theta_2)) \leq \theta_2$$

wherein $\phi_2 = \sin^{-1}(\sin(\tan^{-1}(L_2/2d_2))/n_2)$, or $$n_2 \times \cos(\phi_2+\theta_2) > 1$$

wherein $\phi_2 = \sin^{-1}(\sin(\tan^{-1}(L_2/2d_2))/n_2)$.

According to such a surface light source system, it can be secured that, from those portions of the surface light source system that face to the parts between the emission sources arranged in the one direction, light will be emitted in the direction of the normal to the surface light source system. Further, it can also be secured that, from those portions of the surface light source system that face to the parts between the emission sources arranged in the other direction, light will be emitted in the direction of the normal to the surface light source system. Therefore, the surface of the surface light source system can be effectively prevented from becoming non-uniform in luminance and in color, and the efficiency of utilization of the light emitted from the emission sources can also be increased.

A second surface light source system according to the present invention comprises a lenticular lens sheet having multiple unit lenses, each of the unit lenses projecting on the light-exiting side; and a light source unit having emission sources, the emission sources being capable of being divided into two types or more according to wavelength ranges of light they emit, wherein the unit lenses in the lenticular lens sheet are arranged in one direction parallel to a sheet plane of the lenticular lens sheet at approximately regular intervals, wherein the emission sources are arranged on a plane parallel to the sheet plane of the lenticular lens sheet, wherein emission sources of each type are arranged in the one direction at approximately regular intervals, and wherein intervals at which respective emission sources of two types or more arranged in the one direction may be nearly the same in length. According to such a surface light source system, the lenticular lens sheet can effectively prevent the surface of the system from becoming non-uniform in luminance and in color at least in one direction. The emission sources may substantially be point light sources. Light emitting diodes can be used as point light sources.

In the second surface light source system according to the present invention, a length L of the intervals at which the emission sources of each type are arranged in the one direction, a distance d between the light source unit and the lenticular lens sheet, measured along a normal to the sheet plane of the lenticular lens sheet, an angle θ between the normal and a tangent line to an edge, in the one direction, of the unit lens in a cross section taken along the one direction and along the normal, and a refractive index n of a material for the unit lenses may be made to fulfill the following relationship:

$$\cos^{-1}(n \times \cos(\phi+\theta)) \leq \theta$$

wherein $\phi = \sin^{-1}(\sin(\tan^{-1}(L/2d))/n)$, or $$n \times \cos(\phi+\theta) > 1$$

wherein $\phi = \sin^{-1}(\sin(\tan^{-1}(L/2d))/n)$.

According to such a surface light source system, it can be secured that, from those portions of the surface light source system that face to the parts between the emission sources arranged in the one direction, light will be emitted in the direction of the normal to the surface light source system. Therefore, the surface of the surface light source system can be effectively prevented from becoming non-uniform in luminance and in color, and the efficiency of utilization of the light emitted from the emission sources can also be increased.

Further, in the second surface light source system according to the present invention, the light source unit may at least has first emission sources having a first emission center wavelength second emission sources having a second emission center wavelength, the second emission center wavelength being longer than the first emission center wavelength and third emission sources having a third emission center wavelength, the third emission center wavelength being longer than the second emission center wavelength; the first emission sources, the second emission sources or the third emission sources may be arranged in the one direction at approximately regular distances; the intervals at which the first multiple emission sources are arranged in the one direction, the intervals at which the second multiple emission sources are arranged in the one direction, and the intervals at which the third multiple emission sources arranged in the one direction may be nearly the same in length; and a shortest distance between two of the second multiple emission sources, measured along the sheet plane of the lenticular lens sheet, may be shorter than the intervals at which the second emission sources are arranged in the one direction.

Furthermore, in the second surface light source system according to the present invention, the light source unit may further has a substrate layer that supports the emission sources, and a reflecting layer formed on the same side of the substrate layer as the emission sources. According to such a surface light source system, light traveling towards the non-observer side (non-light-exiting side) can be reflected from the reflecting layer to the observer side, whereby the efficiency of utilization of the light emitted from the emission sources can be increased. In this light source unit (a set of emission sources, light source part), the reflecting layer may be formed such that the reflecting layer occupies 50% or more of a whole area of a surface that can be seen in the front view from one side. Alternatively, in this light source unit (a set of emission sources, light source part), the reflecting layer may be formed on the whole area of the surface that can be seen in the front view from the one side, excluding those portions of the surface that the emission sources occupy. The reflectance of the reflecting layer is preferably 85% or more, more preferably 90% or more. The reflecting layer may be formed such that the reflecting layer diffusely reflects light.

The second surface light source system according to the present invention may further comprises a diffusing sheet with a haze value of 50 or more, the diffusing sheet having fine irregularities on its light-exiting side, and the diffusing sheet may be placed on the light-exiting side of the lenticular lens sheet. According to such a surface light source system, the surface of the system can be more effectively prevented from becoming non-uniform in luminance and in color.

Furthermore, in the second surface light source system according to the present invention, the lenticular lens sheet may have a scattering layer that scatters light; and the scattering layer may be formed such that the scattering layer extends along a contours of the unit lenses so as to form a light-exiting-side-surface of the lenticular lens sheet. According to such a surface light source system, the surface of the system can be more effectively prevented from becoming non-uniform in luminance and in color. In such a surface light source system, a length p of the intervals at which the unit lenses are arranged in the one direction and a thickness t of the scattering layer may be made to fulfill the following relationship:

$$p/10 \leq t \leq p/3.$$

According to such a surface light source system, light that is totally reflected on the unit lenses and emerges from the unit lenses at great angles can be diffused and scattered, and can thus be attenuated.

Further, in the second surface light source system according to the present invention,
in a cross section taken along a normal to the sheet plane of the lenticular lens sheet and along the one direction, the unit lenses may be in the shape of a part of an ellipsoid whose major axis is in parallel with the normal; and a semimajor axis of the ellipsoid may not be less than 2.5 times and may not be more than 5 times a semiminor axis of the ellipsoid. According to such a surface light source system, the surface of the system can be more effectively prevented from becoming non-uniform in luminance and in color.

A third surface light source system according to the present invention comprises a fly's eye lens sheet having multiple unit lenses, each of the unit lenses projecting on the light-exiting side; and a light source unit having emission sources arranged in one direction parallel to a sheet plane of the fly's eye lens sheet at approximately regular intervals, wherein the unit lenses are arranged in the one direction at approximately regular intervals. According to such a surface light source system, the fly's eye lens sheet can effectively prevent the surface of the system from becoming non-uniform in luminance and in color at least in one direction. The emission sources may substantially be point light sources. Light emitting diodes can be used as point light sources.

In the third surface light source system according to the present invention, a length L of the intervals at which the emission sources are arranged in the one direction, a distance d between the light source unit and the fly's eye lens sheet, measured along a normal to the sheet plane of the fly's eye lens sheet, an angle θ between the normal and a tangent line to an edge, in the one direction, of the unit lens in the cross section taken along the one direction and along the normal, and a refractive index n of a material for the unit lenses may be made to fulfill the following relationship:

$$\cos^{-1}(n \times \cos(\phi+\theta)) \leq \theta$$

wherein $\phi = \sin^{-1}(\sin(\tan^{-1}(L/2d))/n)$,
or $$n \times \cos(\phi+\theta) > 1,$$

wherein $\phi = \sin^{-1}(\sin(\tan^{-1}(L/2d))/n)$.
According to such a surface light source system, it can be secured that, from those portions of the surface light source system that face to the parts between the emission sources arranged in the one direction, light will be emitted in the direction of the normal to the surface light source system. Therefore, the surface of the surface light source system can be effectively prevented from becoming non-uniform in luminance, and the efficiency of utilization of the light emitted from the emission sources can also be increased.

Further, in the third surface light source system according to the present invention, the unit lenses may also be arranged in other direction at approximately regular intervals, the other direction being parallel to the sheet plane of the fly's eye lens sheet and being different from the one direction; and the emission sources in the light source unit may also be arranged in the other direction at approximately regular intervals. According to such a surface light source system, the surface of the system can be prevented from becoming non-uniform in luminance in two directions, the one direction and the other direction, by one fly's eye lens sheet. The above other direction may be either perpendicular to or non-perpendicular to the above one direction. In such a surface light source system, a length L of the intervals at which the emission sources are arranged in the one direction, a distance d between the light source unit and the fly's eye lens sheet, measured along a normal to the sheet plane of the fly's eye lens sheet, an angle θ between the normal and a tangent line to an edge, in the one direction, of the unit lens in the cross section taken along the one direction and along the normal, and a refractive index n of a material for the unit lenses may be made to fulfill the following relationship:

$$\cos^{-1}(n \times \cos(\phi+\theta)) \leq \theta$$

wherein $\phi = \sin^{-1}(\sin(\tan^{-1}(L/2d))/n)$,
or $$n \times \cos(\phi+\theta) > 1$$

wherein $\phi = \sin^{-1}(\sin(\tan^{-1}(L/2d))/n)$;
and, at the same time, a length $L_2$ of the intervals at which the emission sources are arranged in the other direction, a distance d between the light source unit and the fly's eye lens sheet, measured along the normal to the sheet plane of the fly's eye lens sheet, an angle $\theta_2$ between the normal and a tangent line to an edge, in the other direction, of the unit lens in a cross section taken along the other direction and along the normal, and a refractive index n of a material for the unit lenses may be made to fulfill the following relationship:

$$\cos^{-1}(n \times \cos(\phi_2+\theta_2)) \leq \theta_2$$

wherein $\phi_2 = \sin^{-1}(\sin(\tan^{-1}(L_2/2d))/n)$,
or $$n \times \cos(\phi_2+\theta_2) > 1$$

wherein $\phi_2 = \sin^{-1}(\sin(\tan^{-1}(L_2/2d))/n)$.
According to such a surface light source system, it can be secured that, from those portions of the surface light source system that face to the parts between the emission sources arranged in the one direction, light will be emitted in the direction of the normal to the surface light source system. Further, it can also be secured that, from those portions of the surface light source system that face to the parts between the emission sources arranged in the other direction, light will be emitted in the direction of the normal to the surface light source system. Therefore, the surface of the surface light source system can be effectively prevented from becoming non-uniform in luminance, and the efficiency of utilization of the light emitted from the emission sources can also be increased.

Further, in the third surface light source system according to the present invention, the emission sources in the light source unit may include emission sources of two types or more that are different in the wavelength range of light they emit; emission sources of each type may be arranged in the one direction at approximately regular intervals; and intervals at which respective emission sources of two types or more arranged in the one direction may be nearly the same in length. According to such a surface light source system, the fly's eye lens sheet can prevent the surface of the system from becoming non-uniform in luminance and in color at least in one direction. In such a surface light source system, a length L of the intervals at which the emission sources of each type are arranged in the one direction, the distance d between the light source unit and the fly's eye lens sheet, measured along a normal to the sheet plane of the fly's eye lens sheet, an angle θ between the normal and a tangent line to an edge, in the one direction, of the unit lens in a cross section taken along the one direction and along the normal, and the refractive index n of the material for the unit lenses may be made to fulfill the following relationship:

$$\cos^{-1}(n \times \cos(\phi+\theta)) \leq \theta$$

wherein $\phi = \sin^{-1}(\sin(\tan^{-1}(L/2d))/n)$,
or $$n \times \cos(\phi+\theta) > 1$$

wherein $\phi = \sin^{-1}(\sin(\tan^{-1}(L/2d))/n)$.

According to such a surface light source system, it can be secured that, from those portions of the surface light source system that face to the parts between the emission sources arranged in the one direction, light will be emitted in the direction of the normal to the surface light source system. Therefore, the surface of the surface light source system can be effectively prevented from becoming non-uniform in luminance and in color, and the efficiency of utilization of the light emitted from the emission sources can be increased.

Furthermore, in the third surface light source system according to the present invention, the emission sources in the light source unit may include emission sources of two types or more that are different in the wavelength range of light they emit; emission sources of each type may be arranged in the one direction at approximately regular intervals; intervals at which respective emission sources of two types or more arranged in the one direction may be nearly the same in length; the emission sources of each type may also be arranged in other direction at approximately regular intervals, the other direction being parallel to the sheet plane of the fly's eye lens sheet and being different from the one direction; intervals at which respective emission sources of two types or more arranged in the other direction may be nearly the same in length; and the unit lenses may also be arranged in the other direction at approximately regular intervals. According to such a surface light source system, the surface of the system can be effectively prevented from becoming non-uniform in luminance and in color in two directions, the one direction and the other direction, by one fly's eye lens sheet. The above other direction may be either perpendicular to or non-perpendicular to the above one direction. In such a surface light source system, a length of the intervals at which the emission sources of each types are arranged in the one direction, a distance d between the light source unit and the fly's eye lens sheet, measured along a normal to the sheet plane of the fly's eye lens sheet, an angle θ between the normal and a tangent line to an edge, in the one direction, of the unit lens in a cross section taken along the one direction and along the normal, and the refractive index n of the material for the unit lenses may be made to fulfill the following relationship:

$$\cos^{-1}(n \times \cos(\phi+\theta)) \leq \theta$$

wherein $\phi = \sin^{-1}(\sin(\tan^{-1}(L/2d))/n)$,
or $$n \times \cos(\phi+\theta) > 1$$

wherein $\phi = \sin^{-1}(\sin(\tan^{-1}(L/2d))/n)$;
and, at the same time, a length $L_2$ of the intervals at which the emission sources of each type are arranged in the other direction, a distance d between the light source and the fly's eye lens sheet, measured along the normal to the sheet plane of the fly's eye lens sheet, an angle $\theta_2$ between the normal and a tangent line to an edge, in the other direction, of the unit lens in a cross section taken along the other direction and along the normal, and a refractive index n of a material for the unit lenses may be made to fulfill the following relationship:

$$\cos^{-1}(n \times \cos(\phi_2+\theta_2)) \leq \theta_2$$

wherein $\phi_2 = \sin^{-1}(\sin(\tan^{-1}(L_2/2d))/n)$,
or $$n \times \cos(\phi_2+\theta_2) > 1$$

wherein $\phi_2 = \sin^{-1}(\sin(\tan^{-1}(L_2/2d))/n)$.

According to such a surface light source system, it can be secured that, from those portions of the surface light source system that face to the parts between the emission sources arranged in the one direction, light will be emitted in the direction of the normal to the surface light source system. Further, it can also be secured that, from those portions of the surface light source system that face to the parts between the emission sources arranged in the other direction, light will be emitted in the direction of the normal to the surface light source system. Therefore, the surface of the surface light source system can be effectively prevented from becoming non-uniform in luminance and in color, and the efficiency of utilization of the light emitted from the emission sources can also be increased.

Furthermore, in the third surface light source system according to the present invention, the light source unit may further has a substrate layer that supports the emission sources, and a reflecting layer formed on the same side of the substrate layer as the emission sources. According to such a surface light source system, light traveling towards the non-observer side (non-light-exiting side) can be reflected from the reflecting layer to the observer side, whereby the efficiency of utilization of the light emitted from the emission sources can be increased. In this light source unit (a set of emission sources, light source part), the reflecting layer may be formed such that the reflecting layer occupies 50% or more of a whole area of a surface that can be seen in the front view from one side. Alternatively, in this light source unit (a set of emission sources, light source part), the reflecting layer may be formed on the whole area of the surface that can be seen in the front view from the one side, excluding those portions of the surface that the emission sources occupy. The reflectance of the reflecting layer is preferably 85% or more, more preferably 90% or more. The reflecting layer may be formed such that the reflecting layer diffusely reflects light.

The third surface light source system according to the present invention may further comprise a diffusing sheet with a haze value of 50 or more, the diffusing sheet having fine irregularities on its light-exiting side, and the diffusing sheet may be placed on the light-exiting side of the fly's eye lens sheet. According to such a surface light source system, the surface of the system can be more effectively prevented from becoming non-uniform in luminance.

Furthermore, in the third surface light source system according to the present invention, the fly's eye lens sheet may have a scattering layer that scatters light; and the scattering layer may be formed such that the scattering layer extends along a contours of the unit lenses so as to form a light-exiting-side-surface of the fly's eye lens sheet. According to such a surface light source system, the surface of the system can be more effectively prevented from becoming non-uniform in luminance. In such a surface light source system, a length p of the intervals at which the unit lenses are arranged in the one direction and a thickness t of the scattering layer may be made to fulfill the following relationship:

$$p/10 \leq t \leq p/3.$$

According to such a surface light source system, light that is totally reflected from the unit lenses and emerges from the unit lenses at great angles can be diffused and scattered, and can thus be attenuated. In the third surface light source system according to the present invention, in a cross section taken along a normal to the sheet plane of the fly eye lens sheet and along the one direction, the unit lenses may be in the shape of a part of an ellipsoid whose major axis is in parallel with the normal; and a semimajor axis of the ellipsoid may not be less than 2.5 times and may not be more than 5 times a semiminor axis of the ellipsoid. According to such a surface light source system, the surface of the system can be more effectively prevented from becoming non-uniform in luminance.

A light source unit according to the present invention comprises: a substrate layer, a circuit layer formed at least on one surface of the substrate layer so as to form a circuit; emission sources arranged on a plane, the emission sources are supported on one side of the substrate layer and are connected to the circuit of the circuit layer; and a reflecting layer formed on the one side of the substrate layer so as to reflect light, wherein the reflecting layer forms the surface, on the one side, of the light source unit and occupies 50% or more of a whole area of a surface that can be seen when viewed from the one side. According to the light source unit of the present invention, the reflecting layer can reflect light traveling towards the non-observer side (non-light-exiting side) to the observer side, whereby the efficiency of utilization of the light emitted from the light sources can be increased. Alternatively, in such a light source unit, the reflecting layer may be formed on the whole area of the substrate layer surface in the front view from the one side, excluding those portions of the surface that the emission sources occupy. Further, the reflectance of the reflecting layer is preferably 85% or more, more preferably 90% or more. The reflecting layer may be formed such that the reflecting layer diffusely reflects light.

In the light source unit according to the present invention, the emission sources may be arranged in one direction on the substrate layer at approximately regular intervals and also be arranged on the substrate layer in other direction on the substrate layer at approximately regular intervals, the other direction being different from the one direction. The above other direction may be either perpendicular to or non-perpendicular to the one direction. The emission sources may substantially be point light sources. Light emitting diodes may be used as point light sources.

In the light source unit according to the present invention, the substrate layer may have a metallic layer made from metal. According to such a light source unit, the heat generated by the light sources can be effectively radiated through the metallic layer.

Further, in the light source unit according to the present invention, an area of less than 10% of surfaces, on a side of the substrate layer, of the emission sources may be exposed to the air. According to such a light source unit, the heat generated by the emission sources can be effectively radiated through the substrate layer or other constituent element that is in contact with the emission sources.

Furthermore, in the light source unit according to the present invention, the substrate layer may have a metallic layer made of metal and an insulating layer disposed on a surface of the metallic layer; the circuit layer may be disposed on the insulating layer; and the emission sources may be surface-mounted on the circuit layer. According to such a light source unit, since the emission sources are surface-mounted on the circuit layer, the heat generated by the emission sources can be effectively transferred to the substrate layer, and the radiation of heat is thus increased. Moreover, this light source unit can be easily produced.

Furthermore, the light source unit according to the present invention may further comprise illuminance sensors supported on the one side of the substrate layer. According to such a light source unit, the emission of the emission sources can be controlled according to the information obtained by the illuminance sensors so that the emitted light scarcely or never produces non-uniform luminance and color distributions.

Furthermore, in the light source unit according to the present invention, the emission sources may include emission sources of two types or more that are different in the wavelength range of light they emit. According to such a light source unit, the emission sources of two types or more that are different in the wavelength range of light they emit can emit illumination light with enhanced color reproductivity.

Furthermore, in the light source unit according to the present invention, the circuit of the circuit layer may control emission of the emission sources such that the respective emission sources of two types or more that emit light in the same wavelength range emit light time-divisionally. Such a light source unit can eliminate a color filter from a liquid crystal display, so that the liquid crystal display can be produced at decreased production cost. Moreover, since it is not necessary for light to pass through a color filter, the energy efficiency can be greatly increased, and the cost on use can thus be decreased.

Furthermore, in the light source unit according to the present invention, the circuit layer may be formed by a printing technique. According to such a light source unit, the circuit layer can be formed inexpensively and easily.

Furthermore, in the light source unit according to the present invention, the reflecting layer may be formed by a printing technique or a coating technique. According to such a light source unit, the reflecting layer can be formed inexpensively and easily.

A fourth surface light source system according to the present invention comprises: any of the above-described light source units; a lenticular lens sheet having unit lenses, each of the unit lenses projecting on the light-exiting side, wherein the unit lenses are arranged in one direction parallel to a sheet plane of the lenticular lens sheet at approximately regular intervals. According to the surface light source system of the present invention, of the light emerging from the light source unit, the light that travels towards the non-observer side (non-light-exiting side) can be reflected on the reflecting layer to the observer side, whereby the efficiency of utilization of the light emitted from the emission sources can be increased.

Moreover, the lenticular lens sheet can prevent the surface of the surface light source system from becoming non-uniform in luminance.

The fourth surface light source system according to the present invention may further comprise a second lenticular lens sheet having unit lenses, each of the unit lenses projecting on the light-exiting side, and the unit lenses in the second lenticular lens sheet may be arranged in other direction at approximately regular intervals, the other direction being parallel to the sheet plane of the lenticular lens sheet and being different from the one direction. According to such a surface light source system, the surface of the system can be prevented from becoming non-uniform in luminance and in color in two directions. The above other direction may be either perpendicular to or non-perpendicular to the one direction.

A fifth surface light source system according to the present invention comprises: any of the above-described light source units; a fly's eye lens sheet having unit lenses, each of the unit lenses projecting on the light-exiting side, wherein the unit lenses are arranged in one direction parallel to a sheet plane of the fly's eye lens sheet at approximately regular intervals and also arranged in other direction at approximately regular intervals, the other direction being parallel to the sheet plane of the fly's eye lens sheet and being different from the one direction. According to the surface light source system of the present invention, of the light emerging from the light source unit, the light that travels towards the non-observer side (non-light-exiting side) can be reflected on the reflecting layer to the observer side, whereby the efficiency of utilization of the light emitted from the emission sources can be increased. Further, the surface of the surface light source system can be prevented from becoming non-uniform in luminance in two directions by one fly's eye lens sheet. The above other direction may be either perpendicular to or non-perpendicular to the one direction.

DETAILED DESCRIPTION OF THE INVENTION

By referring to the accompanying drawings, an embodiment of the present invention will be described hereinafter.

Figure 1:
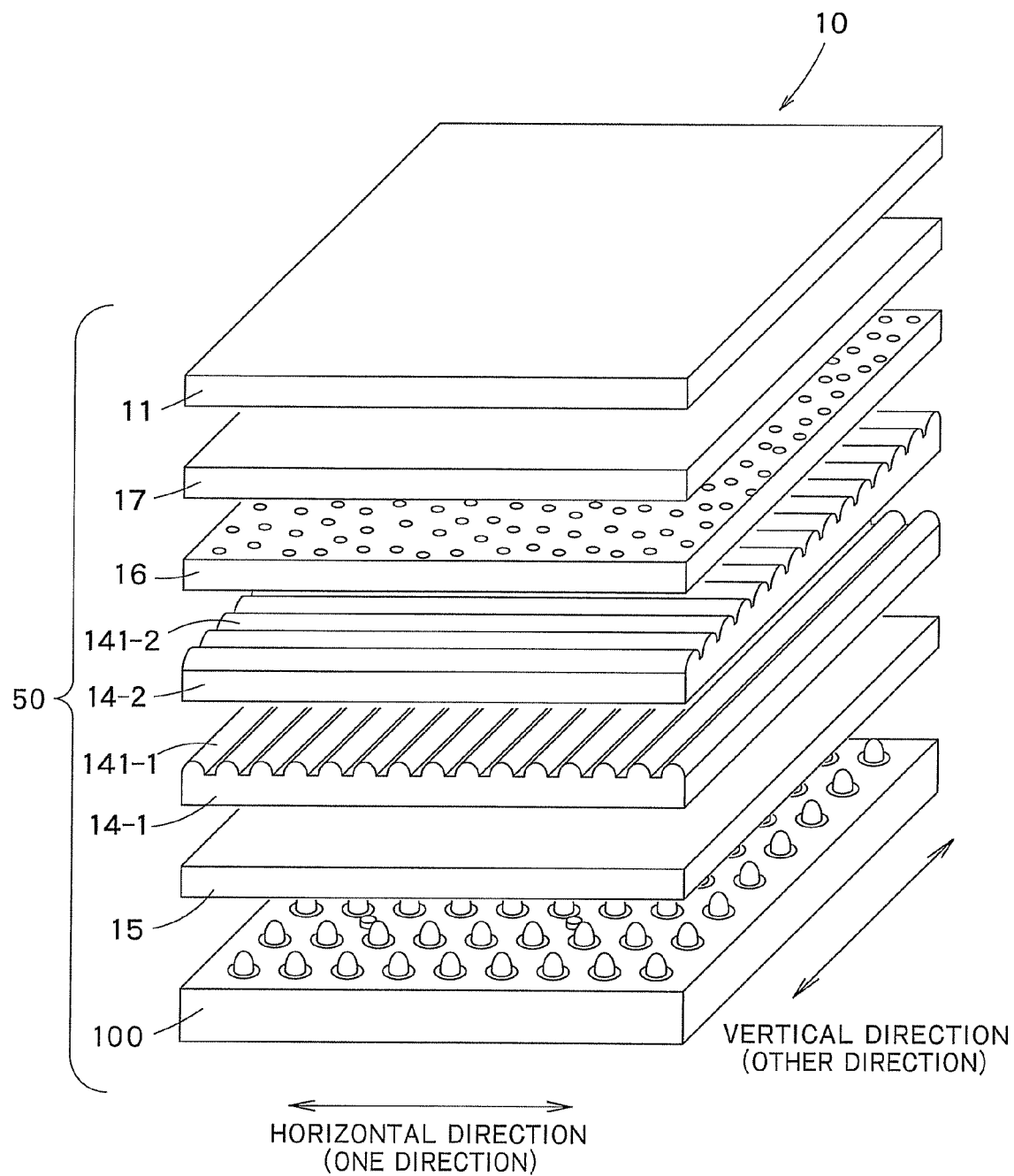
FIG. 1 is for explaining an embodiment of the present invention and is a perspective view showing the entire structure of a transmission type display.

FIG. 1 shows a surface light source system 50 in this embodiment and a light source unit 100, a constituent element of the surface light source system 50, which are in the state of being incorporated in a transmission type display 10. FIGS. 1 to 10 are views showing diagrammatically the light source unit 100, the surface light source system 50, and the transmission type display 10, and their constituent elements shown in the figures are exaggerated in dimension and in shape in order to facilitate the understanding.

The transmission type display 10 in this embodiment comprises the surface light source system 50 and an LCD panel 11. That is to say, the transmission type display 10 in this embodiment is a transmission type liquid crystal display whose LCD panel 11, which is operated according to image information, is illuminated by the surface light source system 50. The surface light source system 50 in this embodiment comprises a light source unit 100, a transparent sheet 15, a first lenticular lens sheet 14-1, a second lenticular lens sheet 14-2, a diffusing sheet 16, and a reflective polarizing sheet 17. These members 11, 15, 14-1, 14-2, 16, 17, and 100 that are in sheet form are laid one on top of another so that their sheet planes are in parallel with each other.

Figure 2:
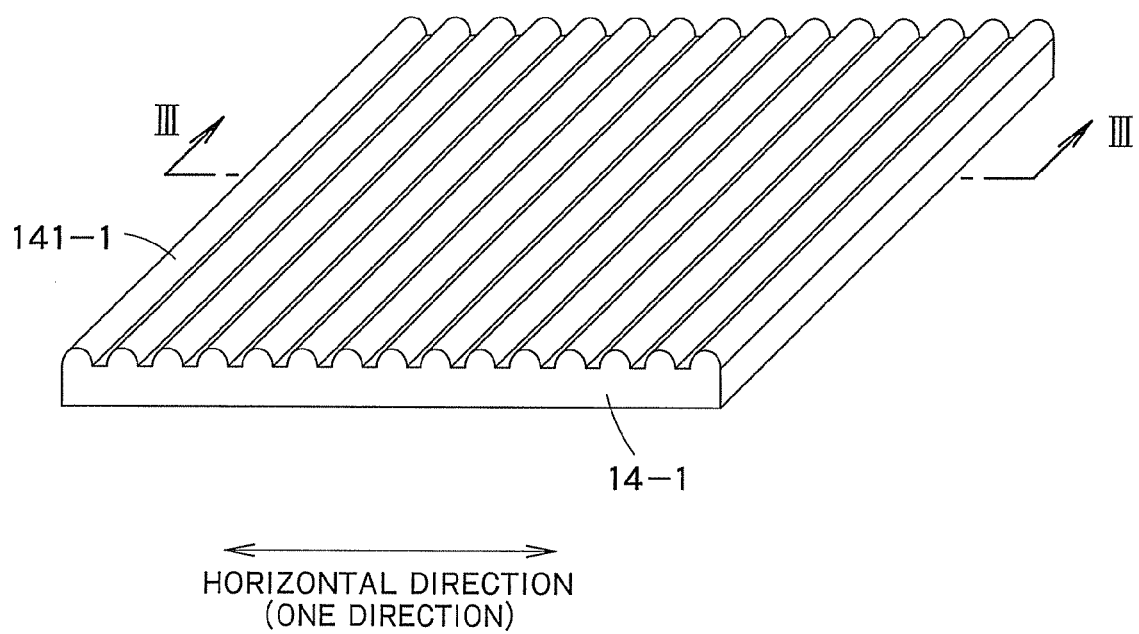
FIG. 2 is a perspective view showing a lenticular lens sheet incorporated in the display shown in FIG. 1.
Figure 3:
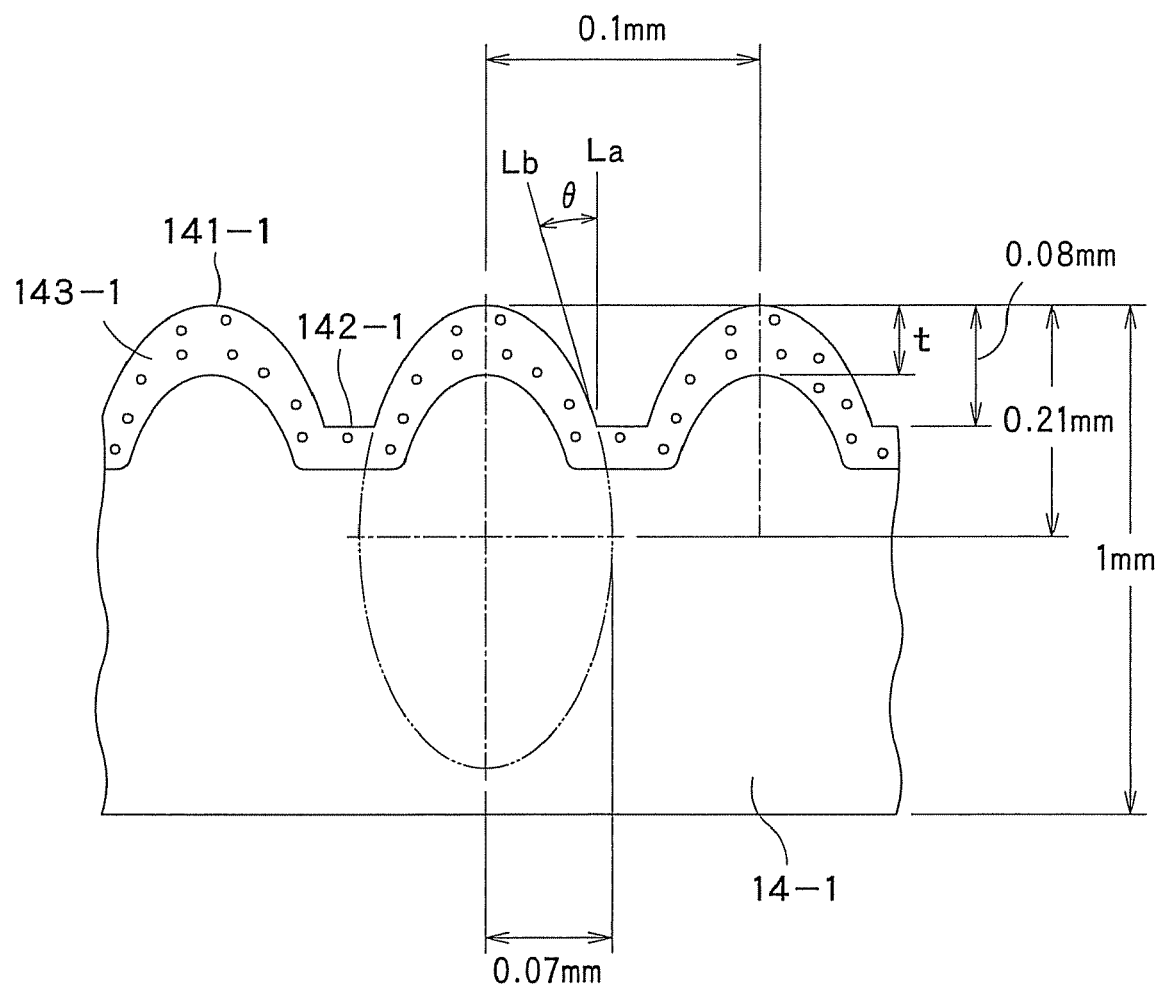
FIG. 3 is an enlarged sectional view taken along line III-III of FIG. 2.
Figure 4:
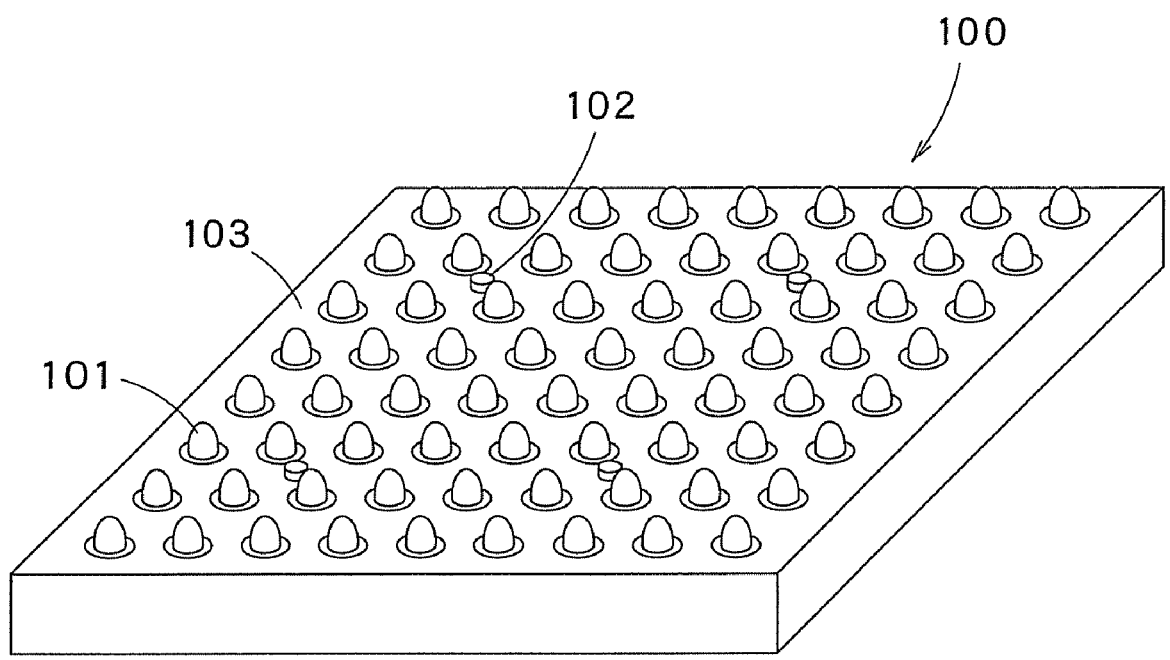
FIG. 4 is a perspective view showing a light source unit incorporated in the display shown in FIG. 1.
Figure 5:
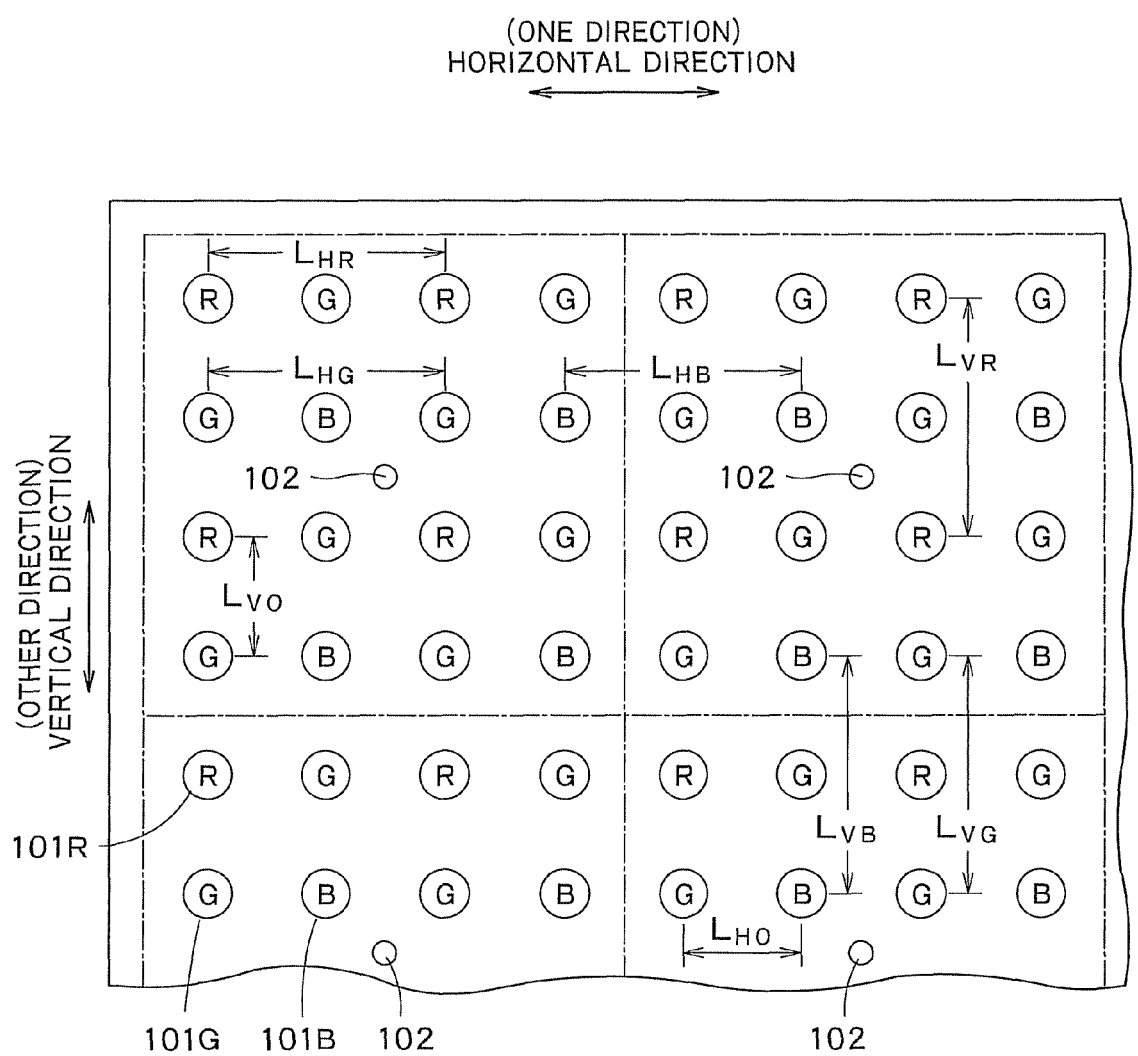
FIG. 5 is a view showing the arrangement of emission sources in the light source unit shown in FIG. 4.

Referring to FIGS. 1 to 3, the lenticular lens sheets 14-1, 14-2 have multiple unit lenses 141-1, 141-2 with convexity on the light-exiting side (observation side), respectively. Further, as FIGS. 1, 4 and 5 show, the light source unit 100 comprises a substrate layer 104, a circuit layer 106 formed on the substrate layer 104, multiple emission sources 101 supported on one side of the substrate layer 104 and connected to the circuit layer 106, and a diffuse-reflecting layer 103 for reflecting light, formed on one side of the substrate layer 104. In this embodiment, the emission sources 101 consist of light emitting diodes. The constituent elements of the transmission type display 10 and the constituent elements of the surface light source system 50, including the light source unit 100 and the first lenticular lens sheet 14-1 and the second lenticular lens sheet 14-2, will be described in detail hereinafter.

A known LCD panel composed of a transmission type liquid crystal display element can be used as the LCD panel 11. The LCD panel 11 may be of any size and can have any number of pixels. For example, the LCD panel 11 may be of 30-inch size and of 800×600 dot matrix display. Between this LCD panel 11 and the light source unit 100 that will be described later, the reflective polarizing sheet 17, the diffusing sheet 16, the second lenticular lens sheet 14-2, the first lenticular lens sheet 14-1, and the transparent sheet 15 are laid in the order mentioned, the sheets being named from the one situated on the LCD panel 11 side to the one situated on the light source unit 100 side.

The transparent sheet 15 is nearly colorless, transparent sheet placed between the emission sources 101 and the lenticular lens sheet 14-1. This transparent sheet 15 is for making up for the insufficiency of rigidity of the lenticular lens sheets 14-1, 14-2 and making up for the insufficiency of rigidity of the diffusing sheet 16, and of the reflective polarizing sheet 17. Between the transparent sheet 15 and the light source unit 100, a transparent spacer, not shown in the figure, is placed in order to keep the distance between the transparent sheet 15 and the emission sources 101 in the light source unit 100 constant.

Next, the diffusing sheet 16 will be explained. The light-exiting-side surface of the diffusing sheet 16 is a so-called matted surface. That is to say, fine irregularities are made in the light-exiting-side surface of the diffusing sheet 16, and transmitted light emerges from the diffusing sheet 16 after being diffused by these irregularities. In this embodiment, the haze value of the diffusing sheet 16 may be made about 80, for example. It is desirable to make the haze value of the diffusing sheet 50 or more in order for the LCD panel 11 to be less non-uniform in luminance and to have increased normal brightness (front brightness, front luminance). In particular, in the case where the haze value is increased by the surface profile, like the diffusing sheet 16 in this embodiment, the non-uniformity of luminance can be reduced to a greater extent with a higher haze value because an increase in normal brightness can be expected thanks to the lens effects.

The reflective polarizing sheet 17 is positioned between the LCD panel 11 and the lenticular lens sheet 14-2. The reflective polarizing sheet 17 is a polarized-light-separating sheet useful for increasing luminance without narrowing viewing angle. A sheet "DBEF", manufactured by Sumitomo 3M Limited, Japan, may be used as the reflective polarizing sheet 17.

Next, the first lenticular lens sheet 14-1 and the second lenticular lens sheet 14-2 will be described in detail with reference mainly to FIGS. 1 to 3. FIG. 2 is a perspective view showing the first lenticular lens sheet 14-1.

As FIGS. 1 and 2 show, the first lenticular lens sheet 14-1 has multiple unit lenses 141-1 and each of the unit lenses 141-1 projects on the light-exiting side. The unit lenses 141-1 are arranged in one direction parallel to a sheet plane of the first lenticular lens sheet 14-1 at approximately regular intervals. In an example shown in FIGS. 1 and 2, the "one direction" will extend along the horizontal direction when the first lenticular lens sheet 14-1 is incorporated in the transmission type display 10 and practically used. The unit lenses 141-1 contained in the first lenticular lens sheet 14-1 extend in the direction which is parallel to the sheet plane of the first lenticular lens sheet 14-1 and is perpendicular to the above one direction. That is to say, the multiple unit lenses in the first lenticular lens sheet 14-1 constitute a so-called linear lenticular lens.

The second lenticular lens sheet 14-2 also has multiple unit lenses 141-2 and each of the unit lenses 141-2 projects on the light-exiting side. The unit lenses 141-2 are arranged in other direction parallel to a sheet plane of the second lenticular lens sheet 14-2 at approximately regular intervals. The other direction is different from the above one direction. In an example shown in FIGS. 1 and 2, the "other direction" will extend along the vertical direction when the second lenticular lens sheet 14-2 is incorporated in the transmission type display 10 and practically used. The unit lenses 141-2 contained in the second lenticular lens sheet 14-2 extend in the direction which is parallel to the sheet plane of the second lenticular lens sheet 14-2 and is perpendicular to the above other direction. That is to say, the multiple unit lenses 141-2 in the second lenticular lens sheet 14-2 constitute a so-called linear lenticular lens, like the multiple unit lenses 141-1 in the first lenticular lens sheet 14-1.

The first lenticular lens sheet 14-1 and the second lenticular lens sheet 14-2 have the function of reducing the non-uniformity of luminance and that of color that are produced in the directions in which the unit lenses 141-1, 141-2 are arranged. Therefore, in this embodiment in which two lenticular lens sheets are placed so that the directions in which their unit lenses are arranged are perpendicular to each other, the non-uniformity of luminance and the non-uniformity of color of the planar light (the light in plane information) projected from the light source unit 100 can be reduced, and the planar light (the light in a plane formation) can thus be made uniform. The first lenticular lens sheet 14-1 and the second lenticular lens sheet 14-2 have nearly the same structure, although the lenticular lens sheets 14-1, 14-2 are incorporated in the transmission type display 10 in different directions, such that the directions in which the unit lenses in the respective sheets are arranged are different from each other. The first lenticular lens sheet 14-1 will now be described in more detail with reference mainly to FIGS. 2 and 3. The following description regarding the first lenticular lens sheet 14-1 is also applicable to the second lenticular lens sheet 14-2.

FIG. 3 is an enlarged sectional view taken along line III-III of FIG. 2. That is to say, FIG. 3 is a sectional view of the first lenticular lens sheet 14-1 taken along the normal to the sheet plane of the first lenticular lens sheet 14-1 and also along the one direction. As FIG. 3 shows, in a cross section of the first lenticular lens sheet 14-1 taken along the normal to the sheet plane of the first lenticular lens sheet 14-1 and also along the one direction, each unit lens 141-1 is in the shape of a part of an ellipsoid whose major axis is in parallel with the normal. Further, the first lenticular lens sheet 14-1 has multiple unit lenses of one type that are the same in sectional shape, as illustrated in FIG. 3.

The ellipse forming the contour of the unit lens 141-1 in the cross section shown in FIG. 3 has a semimajor axis of 0.21 mm and a semiminor axis of 0.07 mm. As mentioned above, the major axis of this ellipsoid is perpendicular to the sheet plane of the first lenticular lens sheet 14-1. The unit lenses 141-1 are arranged in the above-described one direction with a pitch of 0.1 mm. There is therefore a gap between each two adjacent unit lenses 141-1. In this embodiment, a flat part 142-1 parallel to the sheet plane of the first lenticular lens sheet 14-1 exists between each two adjacent unit lenses 141-1, as shown in FIG. 3. The thickness of the lenticular lens sheet 14-1, corresponding to the distance between the light-entering-side surface of the lenticular lens sheet 14-1 and the apex of the unit lens 141-1, is 1 mm. The distance between the flat part 142-1 and the apex of the unit lens 141-1 (height of the unit lens) is 0.08 mm. In the cross section of the first lenticular lens sheet 14-1 taken along the normal to the sheet plane of the first lenticular lens sheet 14-1 and along the one direction, an angle θ between the normal to the sheet plane of the lenticular lens sheet 14-1 and a tangent line to an edge, in the one direction, of the unit lens is 15°.

Further, in this embodiment, the second lenticular lens sheet 14-2 is dimensionally the same as the first lenticular lens sheet 14-1. The above-described dimensional values in the first lenticular lens sheet 14-1 and the second lenticular lens sheet 14-2 are merely examples, and the above-described dimensional values can be changed, as needed.

Desirably, the semimajor axis of the ellipsoid defining the contour of each unit lens 141-1 is not less than 2.5 times and not more than 5 times the semiminor axis of the ellipsoid, when reduction in non-uniformity of luminance is taken into consideration. If the semimajor axis of the ellipsoid is set at about 2.5 times the semiminor axis of the ellipsoid, even when light rays having the same light intensity have entered the lenticular lens sheet at different angles of incidence, the unit lenses can make the amounts of the light components emerging towards the front side (at an angle of emergence of 0°) nearly the same. The semimajor axis A and semiminor axis B of the ellipsoid defining the contour of the unit lens 141-1, 141-2 in the above-described lenticular lens sheet 14-1, 14-2 are 0.21 mm and 0.07 mm, respectively, and they meet the above requirement. When the semimajor axis of the ellipsoid defining the contour of the unit lens 141-1, 141-2 is less than 2.5 times the semiminor axis of the ellipsoid, those portions of the lenticular lens sheets that are close to the emission sources 101 are higher in luminance, so that the lenticular lens sheets cannot reduce the non-uniformity of color. On the other hand, when the semimajor axis of the ellipsoid defining the contour of the unit lens 141-1, 141-2 is made not less than 2.5 times the semiminor axis of the ellipsoid, the lenticular lens sheets can effectively reduce the non-uniformity of color.

In this embodiment, the lenticular lens sheet 14-1 has the unit lenses 141-1, the unit lenses 141-1 can reflect about 50% of light that has vertically entered the unit lenses 141-1, and can return the light to the light source unit side. Therefore, those portions of the plane of emergence of the surface light source system 50 that face the emission sources 101 can be prevented from becoming excessively bright. Further, the light source unit 100 includes, as mentioned above, the diffuse-reflecting layer 103 for diffusely reflecting light traveling towards the side opposite to the observation side and returning that light to the observation side. Therefore, it is also possible for the diffuse-reflecting layer 103 to diffusely reflect the light that has been returned to the light source unit side by the lenticular lens sheet 14-1, thereby reentering the diffusely reflected light into the lenticular lens sheet at points apart from the emission sources 101. This action of the diffuse-reflecting layer 103 can prevent the surface of the surface light source system 50 from becoming non-uniform in luminance and in color without decreasing the efficiency of utilization of the light from the light source unit 100. In order to prevent the surface of the surface light source system 50 from becoming non-uniform in luminance and in color, it is preferred that 40% or more of light that has vertically entered the lenticular lens sheet be reflected and returned to the side opposite to the observation side.

In this embodiment, the first lenticular lens sheet 14-1 includes a scattering layer 143-1 for scattering light, as shown in FIG. 3. The scattering layer 143-1 extends along a contour of the light-exiting side of the lenticular lens sheet 14-1, i.e., along contours of the flat parts 142-1 and contours of the unit lenses 141-1, so as to form the light-exiting-side surface of the lenticular lens sheet 14-1. In this embodiment, the scattering layer 143-1 is formed such that its thickness t in the vicinity of the apex of each unit lens 141-1 is 0.025 mm. Further, the scattering layer 143-1 is formed by a material prepared by adding, as light-diffusing particles, 20 parts by weight of white beads with a mean particle diameter φ of 0.01 mm to 100 parts by weight of an acrylic resin, the acrylic resin constituting the base of the scattering layer 143-1.

It is preferred that the thickness t of the scattering layer 143-1 and a pitch p with which the unit lenses 141-1 are arranged are made to fulfill the following relationship (1):

$$p/10 \leq t \leq p/3 \quad (1).$$

If the relationship (1) holds, light that is totally reflected from the slant faces of the unit lenses 141-1 can be effectively diffused and scattered and can thus be attenuated.

In the lenticular lens sheet 14-1 in this embodiment, a length p of intervals at which the unit lenses 141-1 are arranged is 0.1 mm, and the thickness t of the scattering layer 143-1 in the vicinity of the apex of each unit lens 141-1 is 0.025 mm, as mentioned above, so that the relationship (1) is met.

In the cross section shown in FIG. 3, when light travels along the contours of the unit lenses 141-1 in the vicinity of their apexes and then the light emerges from the vicinity of the apexes of the unit lenses 141-1, an angle (angle of emergence) between the normal to the sheet plane of the lenticular lens sheet and a direction in which light emerges from the vicinity of the apexes of the unit lenses 141-1 becomes great. On the other hand, when the angle of emergence of light emerging from the vicinity of the apexes of the unit lenses 141-1 becomes small, when the light travels not along the contours of the unit lenses 141-1 in the vicinity of their apexes. If the scattering layer 143-1 is formed along the contours of the unit lenses 141-1, particularly in the vicinity of the apexes of the unit lenses 141-1, light that emerges at great angles of emergence when the scattering layer 143 is not present travels a longer distance inside the scattering layer 143-1 and is scattered in greater amounts. Therefore, a part of the light that emerges at great angles of emergence when the scattering layer 143-1 is not present emerges at decreased angles of emergence, and the remaining light is partly returned to the light source side and reused. Consequently, the amount of the light that emerges at great angles of emergence becomes very small. For this reason, if the scattering layer 143-1 is formed, the non-uniformity of color that is observed when a display having no scattering layer 143-1 is obliquely viewed can be reduced.

On the other hand, light that emerges from the vicinity of the apexes of the unit lenses 141-1 at small angles of emergence when the scattering layer 143-1 is not present travels a short distance inside the scattering layer 143-1. Therefore, the light that emerges at small angles of emergence when the scattering layer 143-1 is not present is scattered by the scattering layer 143-1 only very little, and most of such light can emerge at small angles of emergence.

The scattering layer 143-1 may be formed also on the second lenticular lens sheet 14-2 in the same manner as that in which the scattering layer 143-1 is formed on the first lenticular lens sheet 14-1.

The first lenticular lens sheet 14-1 can be integrally molded by extrusion-molding a transparent acrylic resin with a refractive index of 1.49, for example. The second lenticular lens sheet 14-2 can also be integrally molded by extrusion-molding a transparent acrylic resin with a refractive index of 1.49, for example. More specifically, a light-controlling sheet 14-1 can be formed by two-layer extrusion molding using an acrylic resin for the part other than the scattering layer 143-1 and a resin for the scattering layer 143-1. The resin for the scattering layer 143-1 may be the same acrylic resin as that for the part other than the scattering layer 143-1, including white beads in the above-described proportion. However, the material for the first lenticular lens sheet 14-1 and the second lenticular lens sheet 14-2 is not limited to acrylic resins, and a resin properly selected from other thermoplastic resins having light transmission properties can also be used. Moreover, the first lenticular lens sheet 14-1 and the second lenticular lens sheet 14-2 can be formed by the use of an optically curable resin, such as an ultraviolet- or ionizing-radiation-curable resin.

Next, the light source unit 100 will be described in detail.

Figure 6:
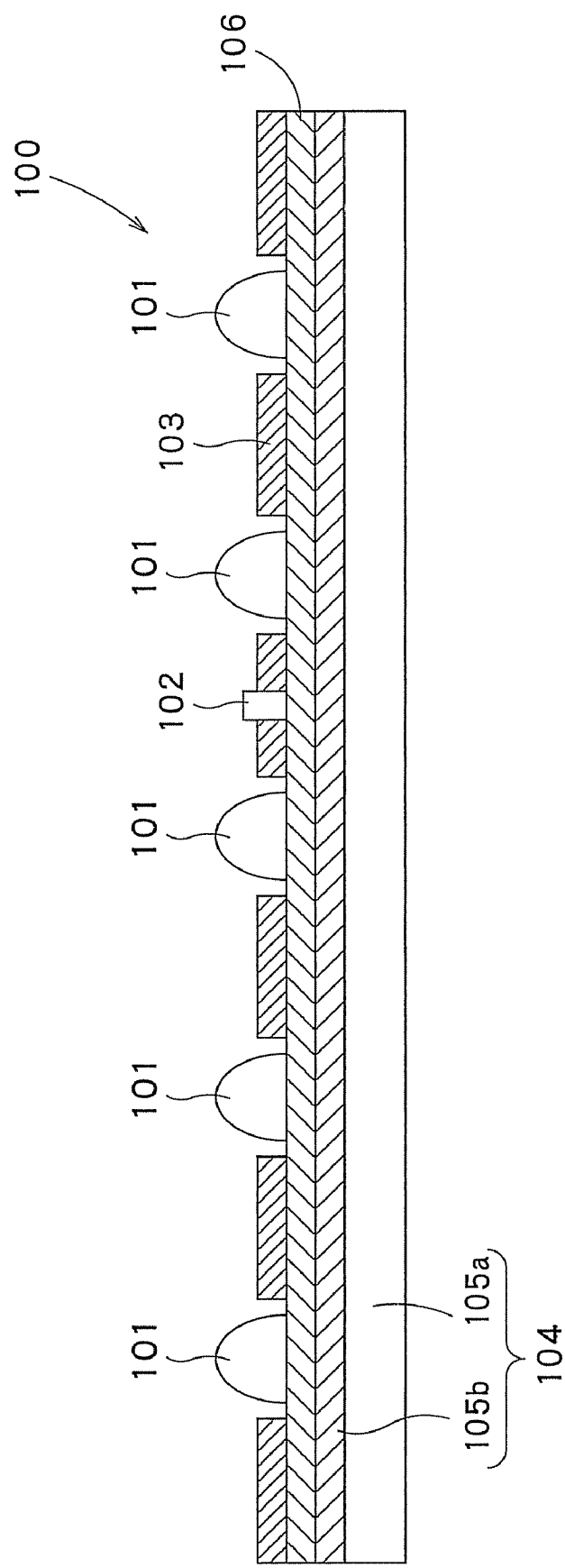
FIG. 6 is a sectional view for explaining the lamination of the light source unit shown in FIG. 4.

As mentioned above, the light source unit 100 includes: the substrate layer 104; the circuit layer 106 formed on the substrate layer 104; the multiple emission sources 101 supported on the one side of the substrate layer 104 and connected to the circuit layer 106; and the diffuse-reflecting layer 103 formed on the one side of the substrate layer 104 so as to diffuse-reflect light. The light source unit 100 further includes illuminance sensors (illumination sensors) 102 for measuring illuminance, on a side, on which the emission sources 101 are supported, of the substrate layer 104, as shown in FIGS. 4 to 6.

The emission sources 101 consist of a large number of light emitting diodes (LEDs) having the function of roughly-point light sources. As shown in FIG. 1, the multiple emission sources 101 consisting of LEDs are arranged on the substrate layer 104 in the direction, in which the multiple unit lenses 141-1 of the first lenticular lens 14-1 are arranged (the above-described one direction), at approximately regular intervals that is length of $L_{HO}$. The multiple emission sources 101 consisting of LEDs are also arranged on the substrate layer 104 in the direction, in which the multiple unit lenses 141-2 of the second lenticular lens 14-2 are arranged (the above-described other direction), at approximately regular intervals that is length of $L_{VO}$.

The length $L_{HO}$ of the intervals at which the emission sources 101 are arranged in the above-described one direction (horizontal direction) and the length $L_{VO}$ of the intervals at which the emission sources 101 are arranged in the above-described other direction (vertical direction) are both 12.5 mm.

FIG. 5 is a view for explaining the arrangement of the emission sources 101 and the illuminance sensors 102. The view shown in FIG. 5 can be seen when the light source unit 100 is viewed from the observation side. The emission sources 101 have emission sources of two types or more that are different in the wavelength range of light they emit. More specifically, the emission sources 101 includes: first multiple emission sources 101B which emits blue light; second multiple emission sources 101G which emits green light; and third multiple emission sources 101R which emits red light. The first multiple emission sources 101B has a first emission center wavelength. The second multiple emission 101G has a second emission center wavelength and the second emission center wavelength is longer than the first emission center wavelength. The third multiple emission sources 101R has a third emission center wavelength and the third emission center wavelength is longer than the second emission center wavelength.

Each of the first emission sources 101B, the second emission sources 101G and the third emission sources 101R are arranged, as shown in FIG. 5, in the above-described one direction (in the direction in which the multiple unit lenses 141-1 of the first lenticular lens 14-1 are arranged) at approximately regular intervals, and also in the above-described other direction (in the direction in which the multiple unit lenses 141-2 of the second lenticular lens 14-2 are arranged) at approximately regular intervals. The intervals at which the respective emission sources 101B, 101G and 101R are arranged in the above one direction, i.e., the intervals at which the respective emission sources that emit light in the three wavelength ranges are arranged in the one direction, are nearly the same in length, and the intervals at which the respective emission sources 101B, 101G and 101R are arranged in the above other direction, i.e., the intervals at which the respective emission sources that emit light in the three wavelength ranges are arranged in the above other direction, are nearly the same in length. That is to say, the first multiple emission sources 101B, the second multiple emission sources 101G, and the third multiple emission sources 101R are arranged in the above-described one direction at respective approximately regular intervals, and a length $L_{HB}$ of the intervals at which the first multiple emission sources 101B are arranged in the one direction, a length $L_{HG}$ of the intervals at which the second multiple emission sources 101G are arranged in the one direction, and a length $L_{HR}$ of the intervals at which the third multiple emission sources 101R are arranged in the one direction are nearly the same. Further, the first multiple emission sources 101B, the second multiple emission sources 101G, and the third multiple emission sources 101R are arranged also in the above other direction at respective approximately regular intervals, and a length $L_{VB}$ of the intervals at which the first multiple emission sources 101B are arranged in the other direction, a length $L_{VG}$ of the intervals at which the second multiple emission sources 101G are arranged in the other direction, and a length $L_{VR}$ of the intervals at which the third multiple emission sources 101R are arranged in the other direction are nearly the same.

More specifically, the emission sources 101 arranged in the horizontal direction (the above one direction) in the topmost row in FIG. 5 are in the order red LED 101R (on the left-side end of the row), green LED 101G, red LED 101R, green LED 101G, . . . . In the second row down in the vertical direction (in the other direction) from the topmost row, green LED 101G is below (on the lower side in FIG. 3, the same shall apply hereinafter) the red LED 101R in the topmost row, and blue LED 101B is below the green LED 101G in the topmost row, so that the emission sources 101 in the second row are arranged in the order green LED 101G, blue LED 101B, green LED 101G, blue LED 101B, . . . .

Therefore, the lengths $L_{HB}$, $L_{HG}$ and $L_{HR}$ of the intervals at which the emission sources 101B, 101G or 101R are arranged (the intervals at which the emission sources that emit light in one wavelength range are arranged, or the arrangement interval length of specific emission sources divided according to the wavelength range they emits) in the above one direction (horizontal direction) is 25 mm, which is two times the above-described length $L_{HO}$ of the intervals at which the emission sources 101 are arranged in the one direction (horizontal direction) (the distance between two emission sources). Similarly, the lengths $L_{VB}$, $L_{VG}$ and $L_{VR}$ of the intervals at which the emission source 101B, 100G and 101R are arranged (the length of the intervals at which the emission sources that emit light in one wavelength range are arranged, or the arrangement interval length of specific emission sources divided according to the wavelength range they emits) in the above other direction (vertical direction) is 25 mm, which is two times the above-described length $L_{VO}$ of the intervals at which the emission sources 101 are arranged in the other direction (vertical direction) (the distance between two emission sources).

Thus, the lengths $L_{HB}$, $L_{HG}$ and $L_{HR}$ of the intervals at which the emission sources 101B, 101G and 100R of three types (three colors) (the arrangement interval length of specific emission sources divided according to the wavelength range they emits) are arranged in the horizontal direction, respectively, and the lengths $L_{VB}$, $L_{VG}$ and $L_{VR}$ of the intervals at which the emission sources 101B, 101G and 101R (the arrangement interval length of specific emission sources divided according to the wavelength range they emits) are arranged in the vertical direction, respectively, are the same value of 25 mm, irrespective of the wavelength range of light that the emission sources 101B, 101G, and 101R emit. The shortest distance, measured along the sheet plane of the lenticular lens sheet, between two of the multiple emission sources 101G that emit green light, i.e., the length of the intervals at which the green emission sources 101G are arranged in an oblique direction, is shorter than the lengths $L_{HG}$ and $L_{VG}$ of the intervals at which the emission sources 101G are arranged in the one direction and in the other direction, respectively. The above-described arrangement of the emission sources is only an example and can be modified, as needed.

In this embodiment, the emission sources 101 are connected to the circuit layer 106 (see FIG. 6) that will be described later. The wiring circuit made in this circuit layer 106 includes a circuit capable of controlling the emission sources 101 so that emission sources 101 emit light of the respective colors time-divisionally. When the red emission sources 101R, the green emission sources 101G, and the blue emission sources 101B are repeatedly switched on or off at short intervals successively, white light can be obtained as a whole. Such time-divisional emission of the emission sources 101B, 101G, and 101R can eliminate a color filter, which is usually contained in a liquid crystal panel 11. Consequently, the transmission type display 10 can be greatly improved in energy efficiency and can be produced at a lower cost.

The illuminance sensors 102 are placed between the emission sources 101, which are arranged regularly in two directions, the horizontal direction and the vertical direction. The illuminance sensor 102 is for measuring the illuminance of light emitted from the emission sources 101 positioned around the sensor. In this embodiment, one illuminance sensor 102 is placed for sixteen (4×4=16) emission sources 101 arranged in an area surrounded by dashed lines as shown in FIG. 5.

The LEDs 101 time-divisionally emit light of the respective colors, as mentioned above. Therefore, by measuring the illuminance of light when light is on, irrespective of its color, the illuminance sensors 102 can separately measure the illuminances of light of the respective colors. Accordingly, if the emission sources 101B, 101G or 101R have come to emit light whose illuminance is different from that of the light the emission sources have emitted previously because of changes in the environment or with time, for example, the emission sources can be evaluated according to the illuminance data obtained by the illuminance sensors 102. By controlling, following the evaluation results, the amount of a current to be supplied to the red emission sources 101R, to the green emission sources 101G, or to the blue emission sources 101B, the overall color of the light to be emitted can be adjusted.

Further, one illuminance sensor 102 is placed for sixteen emission sources 101. It is therefore possible to measure the illuminance of each small surface area of the light source unit 100 in which the sixteen emission sources are present, and it is also possible to control the emission sources 101 such that the light emitted from the emission sources 101 present in each small area is uniform in luminance. Variations in the luminance of the light emitted from the emission sources 101, which are caused by variations in the performance of the individual emission sensors 101, are therefore not produced according to the positions of the emission sources, and illumination light without non-uniformity in luminance can be uniformly emitted.

Referring to FIGS. 4 and 6, of the surface of the light source unit 100 on which the emission sources 101 and the illuminance sensors 102 are supported, those portions on which the emission sources 101 and the illuminance sensors 102 are absent are covered with a diffuse-reflecting layer 103. In this embodiment, the diffuse-reflecting layer 103 occupies 50% or more of the whole area of the surface of the light source unit 100 that can be seen when the light source unit 100 is viewed from the observation side. Therefore, light traveling towards the rear side (opposite to the observation side) can be reflected toward the side of the first lenticular lens sheet 14-1 and the second lenticular lens sheet 14-2 (light-exiting side, observation side), to make the light emerge from the surface light source system 50 as planar illumination light having improved uniformity of luminance. The efficiency of utilization of the light from the emission sources 101 can thus be increased, and the surface light source system 50 can backlight the liquid crystal panel 10 brightly. The reflectance of the reflecting layer is preferably 85% or more, more preferably 90% or more.

Such a diffuse-reflecting layer 103 may contain a base resin and particles different in refractive index from the base resin. The particles are dispersed in the base resin. The diffuse-reflecting layer 103 can be formed, for example, by applying reflecting-layer-forming ink to the substrate layer 104 using a screen process printing or coating technique. The reflecting-layer-forming ink can be prepared by diluting, with an organic solvent, an epoxy-acrylic base resin to which titanium oxide has been added, for example. The reflecting-layer-forming ink may be applied to the substrate layer 104 in such an amount that the thickness of the ink layer will be about 5 µm. Such solvents as ketones and acetals can be used for the organic solvent to be used to prepare the reflecting-layer-forming ink. The above-described manner in which the reflecting layer 103 is formed is only an example and can be modified variously. For example, it is also preferable to use a urethane resin, or a silicone resin, which is excellent in light resistance, in place of the epoxy resin.

The diffuse-reflecting layer 103 formed in such a manner can diffusely reflect light because the refractive index of the base resin is different from the refractive index of the particles dispersed in the base resin. The refractive index of the base resin is herein about 1.5, while the refractive index of titanium oxide is about 2.7. The difference between the refractive index of the base resin and the refractive index of the dispersed particles, therefore, is about 1.2. It is preferred that the difference in refractive index between the base resin and the dispersed particles be 0.5 or more, preferably 1.0 or more, and 1.5 or less. When the difference in refractive index between the base resin and the dispersed particles is 0.5 or more, preferably 1.0 or more, the reflecting layer can reflect light at high reflectance. On the other hand, if the difference in refractive index between the base resin and the dispersed particles is made greater than 1.5, the dispersed particles come to develop a color other than white. Consequently, there arises the possibility that the diffuse-reflecting layer 103 might absorb light. Further, such a diffuse-reflecting layer 103 can have higher reflection efficiency as compared with a reflecting layer that causes specular reflection.

FIG. 6 is a sectional view of the light source unit 100. The light source unit 100 further includes the substrate layer 104 and the circuit layer 106 in addition to the above-described LEDs 101, illuminance sensors 102 and diffuse-reflecting layer 103. In this embodiment, the substrate layer 104 has a metallic layer 105a made of metal, and an insulating layer 105b formed on a surface of the metallic layer 105a. The substrate layer 104 functions as the base of the light source unit 100. In this embodiment, the metallic layer 105a is made of a copper-made plate material. The insulating layer 105b is formed on the metallic layer 105a so as to insulate the metallic layer 105a from contact with the outside. Although an epoxy resin is applied to the metallic layer 105a so as to form the insulating layer 105b in this embodiment, a polyimide resin can also be used in place of the epoxy resin, for example.

A circuit is printed so as to form the circuit layer 106 on the insulating layer 105b in the substrate layer 104. To this circuit layer 106 are connected the LEDs 101 and the illuminance sensors 102. The circuit layer 106 contains a wiring circuit for controlling the driving of the emission sources 101, as mentioned above. The LEDs 101 and the illuminance sensors 102 are surface-mounted on the circuit layer 106.

The substrate layer 104 and the circuit layer 106 constitute a member equivalent to a printed circuit board. The emission sources 101 are mounted on the member equivalent to a printed circuit board, which is made by forming the insulating layer 105b and the circuit layer 106 on the metallic layer 105a in the substrate layer 104, serving as a base. Further, in this embodiment, the whole surfaces, on a side facing to the substrate layer 104, of the emission sources 101 are in contact with the circuit layer 106, and no air layer is present between the emission sources 101 and the circuit layer 106. Therefore, heat that the emission sources 101 generate when the emission sources 101 emit light is efficiently transmitted from the emission sources 101 to the substrate layer 104, and the transmitted heat is efficiently radiated from the substrate layer 104. In order to attain efficient radiation, from the substrate layer 104, of the heat generated by the emission sources 101, it is preferred that only an area of less than 10% of the surfaces, on the side of the substrate layer 104, of the emission sources 101 be exposed to the air. Further, it is preferable to use materials having high thermal conductivity to form the insulating layer 105b and the circuit layer 106 so that the heat generated by the emission sources 101 can be efficiently transmitted to the metallic layer 105a in the substrate layer 104. If the heat that the emission sources 101 generate when the emission sources 101 emit light is efficiently radiated, the non-uniformity of color, which is caused by the heat generation of the emission sources 101, of the light emitted from the emission sources 101 is not produced, and the life of the emission sources 101 can be prolonged.

Next, how light that has entered the lenticular lens sheet 14-1 and 14-2 travels will be described with reference mainly to FIGS. 7 and 8. From FIGS. 7 and 8, the scattering layer 143-1 is eliminated to facilitate the understanding.

The plane of emergence of the surface light source system 50 tends to have the following luminance distribution (brightness distribution): those portions of the plane of emergence that face the emission sources 101 (101B, 101G, 101R) are high in luminance and those portions of the plane of emergence that are apart from the emission sources 101, i.e., those portions of the plane of emergence that face the parts between two adjacent emission sources 101, are low in luminance. In the lenticular lens sheet 14, the unit lenses 141-1, which are situated in such positions that the unit lenses 141-1 face the emission sources 101, have the action of totally reflecting light that enters the lenses nearly vertically, thereby returning the light to the light source side, as shown in FIG. 7 (see light ray A in FIG. 7). This action prevents those portions of the plane of emergence of the surface light source system 50 that face the emission sources 101 from getting excessively high in luminance. Only with this action, however, it is difficult to prevent satisfactorily the plane of emergence of the surface light source system 50 from having a non-uniform luminance distribution. In order to prevent satisfactorily the plane of emergence of the surface light source system 50 from having a non-uniform luminance distribution, it is necessary to increase the luminance of those portions of the lenticular lens sheet 14 that face the parts between two adjacent emission sources 101. That is to say, it is necessary that light that has entered those portions of the lenticular lens sheet 14 that face the parts between two adjacent emission sources 101 be efficiently directed toward the front side (so that the light emerges at an angle of emergence of 0°), thereby increasing the amount of the light that emerges from these portions of the lenticular lens sheet 14 to reach an observer.

One embodiment in which it can be said that the rectifying effect ideally works is a case where light that has reached an edge of each unit lens 141 in the cross section of the lenticular lens sheet taken along the direction in which the unit lenses are arranged (a portion of each unit lens 141 in the vicinity of the flat part 142-1, hereinafter also referred to simply as the edge of the unit lens) emerges in the direction of the normal to the lenticular lens sheet 14. However, if the angle at which light that will reach the edge of each unit lens enters the lenticular lens sheet 14 exceeds a certain angle, the amount of light that emerges from the lenticular lens sheet 14 suddenly decreases greatly. At this time, some portions of the plane of emergence of the surface light source system are observed dark (these portions will be referred to as dark parts). Whether the dark parts will appear or not is influenced by the angle θ (see FIG. 7, hereinafter also referred to simply as the angle θ at the edge of the unit lens) between a tangent line Lb to the edge of the unit lens (see FIG. 7) and the normal La to the sheet plane of the lenticular lens sheet 14 (see FIG. 7) in the cross section taken along the direction in which the unit lenses 141 are arranged and along the normal to the sheet plane of the lenticular lens sheet 14 plane, and also influenced by the angle ϕ at which illumination light enters the lenticular lens sheet (the angel at which illumination light is refracted when the illumination light enters the lenticular lens sheet). Factors in determining the angle ϕ at which illumination light enters the lenticular lens sheet include a length L of the intervals at which the emission sources 101 are arranged in the direction in which the unit lenses 141 are arranged, and a distance d between the emission sources 101 and the lenticular lens sheet 14, measured along the normal La. As for light that directly reaches the lenticular lens sheet 14 from the emission sources 101, the angle ϕ at which the light enters the lenticular lens sheet 14 peaks when the light enters the unit lenses situated in such positions on the lenticular lens sheet 14 that the unit lenses face the parts between two adjacent emission sources.

Further, in this embodiment, the emission sources 101 contain the emission sources 101R, 101G and 101B of three types (three colors) that are different in the wavelength range of light they emit, as mentioned above. Therefore, if the light emitted from the emission sources of each type is non-uniform in luminance, the illumination light emitted from the surface light source system is non-uniform not only in luminance but also in color. For this reason, when the emission sources 101B, 101G and 101R emit light independently, it is necessary to make the light from the respective emission sources 101B, 101G and 101R emerge uniformly from the surface light source system without non-uniformity of luminance. That is to say, the following are required: red light from the emission sources 101R emerges uniformly from the surface light source system without non-uniformity of luminance; green light from the emission sources 101G emerges uniformly from the surface light source system without non-uniformity of luminance; and blue light from the emission sources 101B emerges uniformly from the surface light source system without non-uniformity of luminance.

In this embodiment, therefore, studies were made with consideration mainly for three factors that can affect the effect of rectifying the non-uniformity of luminance, i.e., the length L of the intervals at which the emission sources 101 are arranged, the distance d between the emission sources 101 and the lenticular lens sheet 14, and the angle θ at the edge of the unit lens.

How light that has entered into the lenticular lens sheet 14 usually travels in the lenticular lens sheet 14 will be first explained with reference mainly to FIG. 8. FIG. 8 includes sectional views of the lenticular lens sheet taken along the normal La to the sheet plane of the lenticular lens sheet 14 and along the direction in which the unit lenses 141 of the lenticular lens 14 are arranged. The rightmost unit lens 141a in FIG. 8 is a unit lens situated in such a position that the unit lens faces the part between two adjacent emission sources that emit light in the same wavelength range, among the emission sources 101 of two types or more. In FIG. 8, only one of the two adjacent emission sources 101 is shown. The leftmost unit lens 141d in FIG. 8 is a unit lens situated in such a position that the unit lens faces one of the two adjacent emission sources 101. The unit lens 141b and the unit lens 141c are situated between the unit lens 141a and the unit lens 141d. Therefore, when the length of the intervals at which the multiple emission sources 101 that emit light in the same wavelength range, among the emission sources 101 of two types or more, are arranged in the direction in which the unit lenses 141 of the lenticular lens 14 are arranged is taken as the arrangement interval length L of specific emission sources divided according to the wavelength range they emits, the distance between the unit lens 141a and the unit lens 141d in the sectional view in FIG. 8 is equal to L/2.

Figure 7:
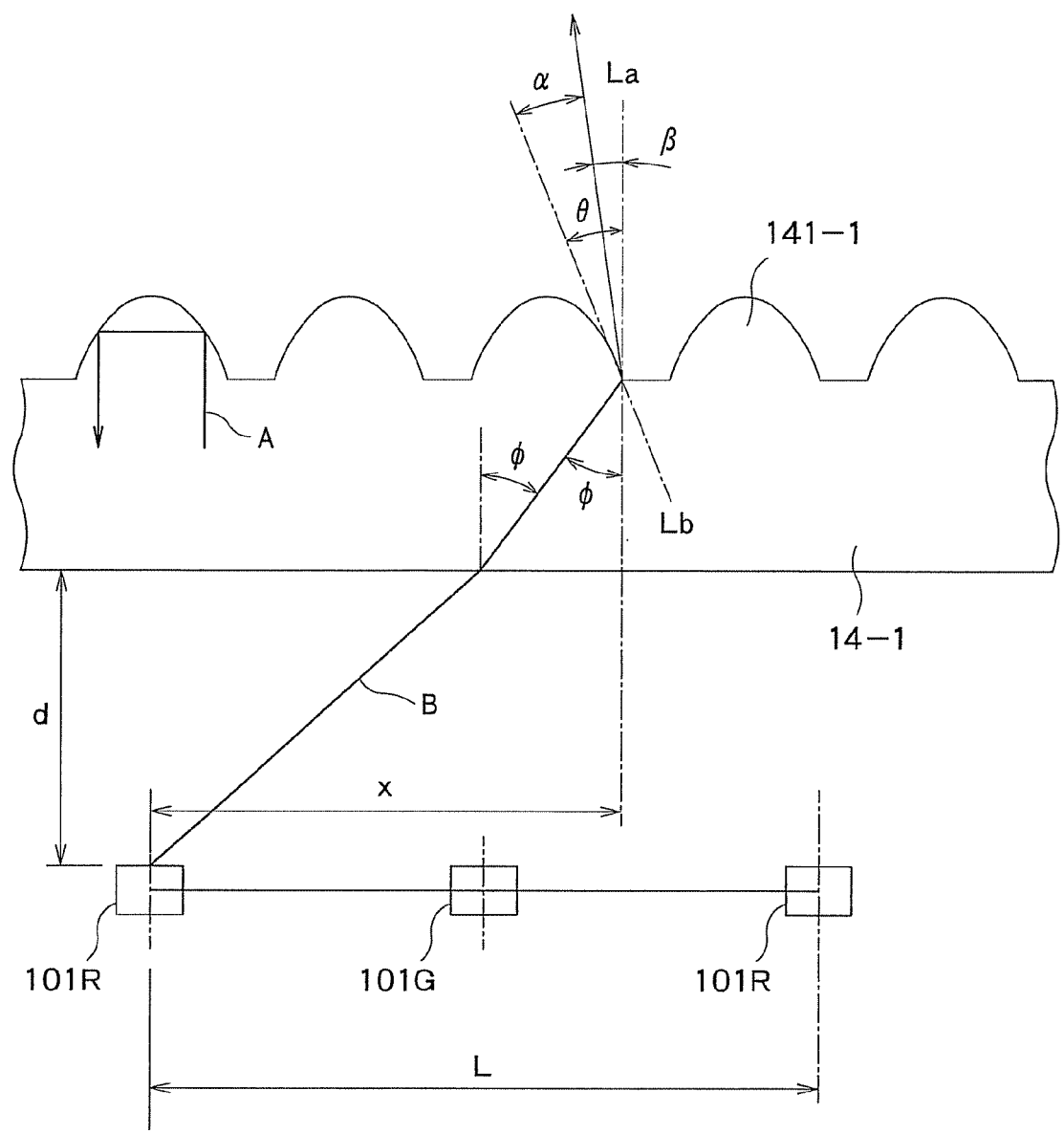
FIG. 7 is a view for explaining the action of the surface light source system incorporated in the display shown in FIG. 1.

With reference to FIG. 7, the angle φ at which light enters the unit lens 141 is now examined. As is clear from FIG. 7, the angle φ is equivalent to the angle of refraction at which light from the emission source 101 is refracted when the light enters the lenticular lens sheet. The angle φ can therefore be expressed by the following equation (2):

$$\varphi=\sin^{-1}(\sin(\tan^{-1}(x/d))/n) \quad (2)$$

where x is a distance between a position of the emission source 101 at which light is emitted and a position of the unit lens 141 into which the light enters, measured along the sheet plane of the lenticular lens sheet 141, d is the distance between the emission source 101 in the light source unit 100 and the lenticular lens sheet 14, measured along the normal La to the sheet plane of the lenticular lens sheet, and n is a refractive index of the lenticular lens sheet.

Figure 8:
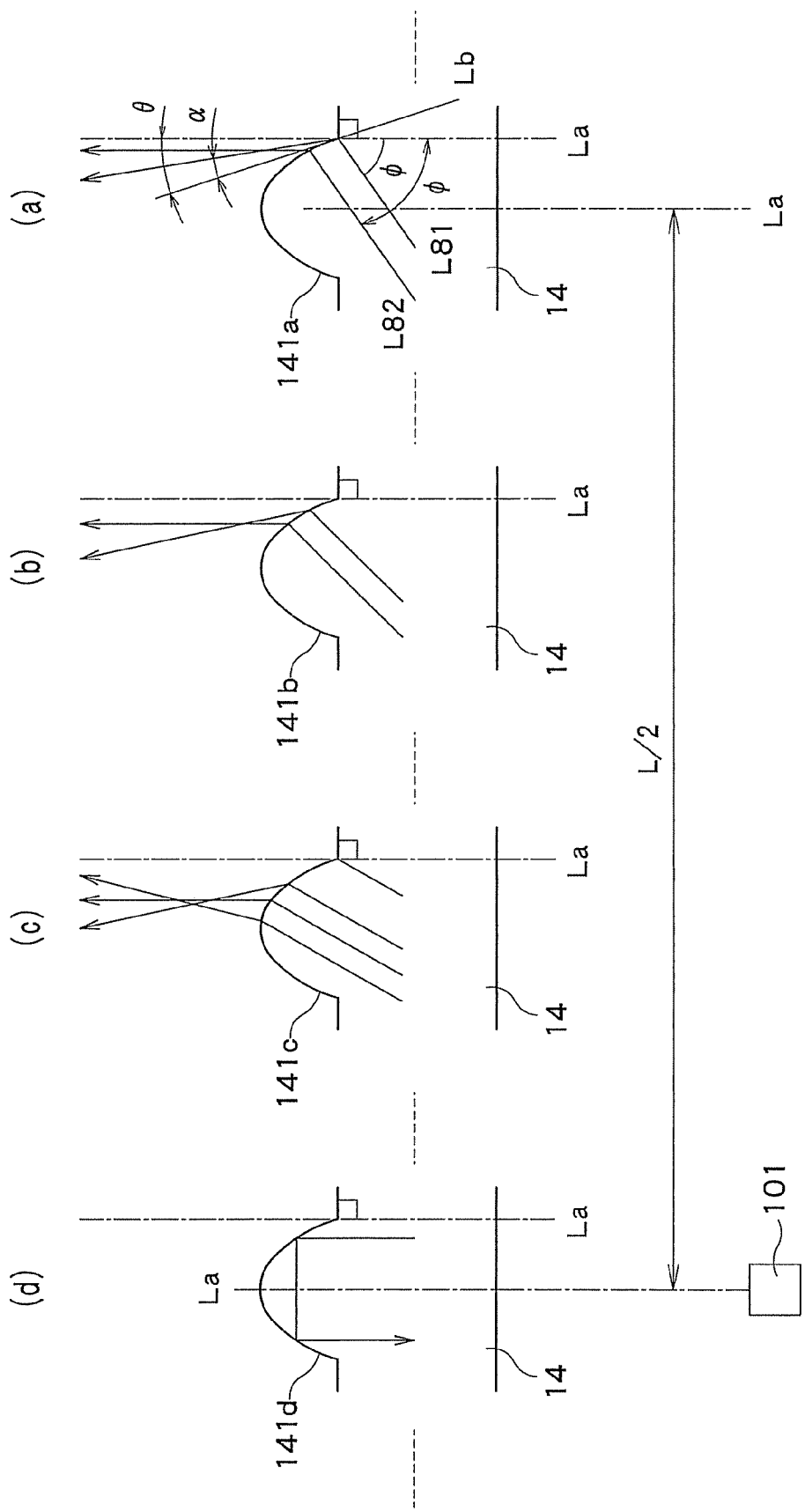
FIG. 8 is a view for explaining the light path of light that has entered a unit lens of a lenticular lens.

The angle φ increases as the distance between the emission source 101 and the unit lens 141 becomes longer, that is to say, as the value of x increases, as shown in FIG. 8. Further, as can be understood from FIG. 7, as the angle φ at which light that will enter the edge of the unit lens 141 enters the lenticular lens sheet increases, the light emerges from the unit lens 141 in a direction more inclined to the side opposite to the tangent line Lb to the edge of the unit lens; in other words, the angle α between the direction in which the light emerges from the unit lens 141 and the tangent light Lb (see FIG. 7) increases. The same applies to light that enters the unit lens 141 at points other than the edge. That is to say, as the angle φ increases, the angle α between the direction in which light emerges from the unit lens 141 and the tangent line Lb to the unit lens 141 at a point from which the light emerges increases. On the contrary, as the angle φ decreases, the light emerges from the unit lens 141 in a direction more inclined to the unit lens side, and, eventually, the light is totally reflected on the unit lens and is returned to the light source unit 100 side. Therefore, according to such a lenticular lens sheet, as the position in which the unit lens is situated gets closer to the emission source 101, the amount of light emerging from the unit lens in the direction of the normal decreases, and the amount of light that is totally reflected on the unit lens and is returned to the light source unit 100 side increases.

In view of this, it is advantageous to set the unit lenses 141 so that light that has entered the lenticular lens sheet can emerge at an angle of emergence of about 0 degrees from the unit lenses 141a that face the parts between two adjacent emission sources 101 (x=L/2), at which luminance tends to get lower. When the unit lenses 141 are so set, a large amount of light can emerge from the unit lenses 141a at small angles of emergence β (the angle between the direction in which light emerges from the unit lens and the normal La, see FIG. 7), and the amount of light that emerges from the unit lenses 141 at small angles of emergence β decreases as the positions of the unit lenses 141 get closer to the emission source 101.

Further, the length of the intervals at which the unit lenses 141 are arranged are usually much smaller than the length of the intervals at which the emission sources are arranged. It is therefore possible to regard the angles φ at which light rays enter various parts of one unit lens 141 nearly the same irrespective of the point at which the light enters the unit lens. For this reason, as for light entering one unit lens 141, as the point at which light enters gets closer to the edge of the unit lens 141 in the cross section taken along the direction in which the unit lenses are arranged, the direction in which the light emerges from the unit lens 141 gets inclined to the unit lens side, and, eventually, the light is totally reflected on the unit lens 141 and is returned to the light source unit 100 side. In view of this, it is effective that light that has entered one unit lens 141 at its edge in the cross section taken along the direction in which the unit lenses are arranged emerges from the unit lens 141 in the direction of the normal La to the lenticular lens sheet 14 or in the direction inclined to the unit lens side. In other words, it is effective that the angle α between the direction in which light that has entered one unit lens 141 at its edge emerges from the unit lens and the normal La is equal to or smaller than the angle θ at the edge of the unit lens. In this case, light that has entered the unit lens 141 at a point closer not to the edge but to the center of the unit lens 141 can emerge from the unit lens 141 in the direction of the normal. In other words, it becomes possible to secure light that emerges from the unit lens in the direction of the normal.

The angle α between the direction in which light that has entered the unit lens at its edge at the angle φ emerges from the unit lens and the tangent line Lb to the edge of the unit lens can be expressed by the following equation:

$$\alpha=\cos^{-1}(n\times\cos(\varphi+\theta)) \quad (3).$$

As mentioned above, it is preferred that this angle α be equal to or smaller than the angle θ at the edge of the unit lens, i.e., that the following relationship is met:

$$\cos^{-1}(n\times\cos(\varphi+\theta))\leq 0 \quad (4).$$

In the relationship (4), n is the refractive index of the lenticular lens sheet, and it is 1.49 in this embodiment. Further, the angle θ at the edge of the unit lens is 15° in this embodiment, as mentioned above.

Furthermore, as mentioned above, it is preferred that it can be secured that, from the unit lenses 141a situated in such positions that the unit lenses face the parts between two adjacent emission sources 101, light will emerge in the direction of the normal, i.e., that the unit lens 141a fulfill the above relationship (4). And in the above equation (2) defining the angle φ at which light enters each unit lens 141a situated in such a position that it faces the part between two adjacent emission sources 101, x is made equal to L/2. That is to say, when the following relationships (5) and (6) are met at the same time, the surface light source system 50 can be prevented, to a significant extent, from having non-uniformity of luminance in the direction in which the unit lenses 141 of the lenticular lens 14 are arranged:

$$\cos^{-1}(n\times\cos(\varphi+\theta))\leq 0 \quad (5)$$

$$\varphi=\sin^{-1}(\sin(\tan^{-1}(L/2d))/n) \quad (6).$$

In this embodiment, in order to rectify the non-uniformity of luminance produced in the horizontal direction (one direction) and the non-uniformity of luminance produced in the vertical direction (other direction), the first lenticular lens sheet 14-1 and the second lenticular lens sheet 14-2 are placed, respectively. It is therefore necessary to examine the first lenticular lens sheet 14-1 and the second lenticular lens sheet 14-2 whether the first lenticular lens sheet 14-1 and the second lenticular lens sheet 14-2 fulfill the relationships (5) and (6) or not. In this embodiment, the same material is used to form the first lenticular lens sheet 14-1 and the second lenticular lens sheet 14-2, so that the two lenticular lens sheets 14-1 and 14-2 have the same refractive index (n=1.49), as mentioned above. Further, the distance d between the emission sources in the light source unit 100 and the first lenticular lens sheet 14-1, measured along the normal La, is 20 mm, while the distance d between the emission sources in the light source unit 100 and the second lenticular lens sheet 14-2, measured along the normal La, is 21 mm.

Furthermore, in this embodiment, the emission sources 101 have the emission sources 101R, 101G and 101B of three types (three colors) that are different in the wavelength range of light they emit, as mentioned above. And it is necessary to rectify separately the non-uniform luminance distributions produced by the light from each of the multiple emission sources 101R, 101G and 101B that emit light in three wavelength ranges. Therefore, the above-described arrangement interval length of specific emission sources divided according to the wavelength range they emits should be employed as the value of L in the above equation (6). Specifically, in examining the rectifying effect of the first lenticular lens sheet 14-1, the above-described arrangement interval length $L_{HB}$, $L_{HG}$ or $L_{HR}$ (25 mm) in the horizontal direction of specific emission sources divided according to the wavelength range they emits is employed as the value of L. Similarly, in examining the rectifying effect of the second lenticular lens sheet 14-2, the above-described arrangement interval length $L_{VB}$, $L_{VG}$ or $L_{VR}$ (25 mm) in the vertical direction of specific emission sources divided according to the wavelength range they emits is employed as the value of L.

If the concrete dimensional values in this embodiment are put in the relationships (5) and (6), $(n \times \cos(\phi+\theta))$ in the relationship (5) becomes greater than 1, so that the term on the left side can not be calculated. This means that light that has entered the unit lenses situated in such positions that the unit lenses face the parts between two adjacent emission sources 101 is totally reflected from the edges of these unit lenses. The light, therefore, can emerge from the unit lens surfaces whose inclination is smaller than the unit lens surfaces at edges, in directions nearly the same as the direction of the normal to the lenticular lens sheet. The surface of the surface light source system can thus be prevented from becoming non-uniform in luminance and in color, as in the case where the above relationships (5) and (6) hold. For this reason, even when the relationship (5) is not calculable, the surface of the surface light source system can be effectively prevented from becoming non-uniform in luminance and in color as long as the following relationships (7) and (8) are met at the same time:

$$n \times \cos(\phi+\theta) > 1 \quad (7)$$

$$\phi = \sin^{-1}(\sin(\tan^{-1}(L/2d))/n) \quad (8).$$

The concrete dimensional values in this embodiment fulfill the above relationships (7) and (8) at the same time.

According to this embodiment described thus far, the factors that can affect the effect of rectifying the non-uniformity of luminance, such as the length L of the intervals at which the emission sources 101 are arranged, the distance d between the emission sources 101 and the lenticular lens sheet 14, and the angle θ at the edge of the unit lens, fulfill the specific relationships. Therefore, light that has reached the unit lenses situated in such positions that the unit lenses face the parts between two adjacent emission sources can efficiently emerge from the unit lenses towards the front side (at an angle of emergence β=2°). Consequently, the light that the surface light source system emits can be effectively prevented from producing non-uniform luminance.

Further, in this embodiment, the emission sources 101 can be divided into the emission sources 101R, 101G and 101B of three types according to wavelength ranges of light they emit. And in this embodiment, the light rays emitted from the respective emission sources of three types can be separately prevented from producing non-uniform luminance. For this reason, the light emitted from the surface light source system can be effectively prevented from producing not only non-uniform luminance but also non-uniform color.

Furthermore, the first lenticular lens sheet 14-1 and the second lenticular lens sheet 14-2 are placed, so that the directions in which light travels can be adjusted both horizontally and vertically. The light emitted from the surface light source system can therefore be prevented from producing non-uniform luminance and color not only in one direction but also two-dimensionally.

Furthermore, according to this embodiment, since light emitting diodes that emit light of different colors are employed as the emission sources, it is possible to control finely the color of light emitted from the surface light source system.

MODIFICATION EXAMPLES

The surface light source system 50 and the light source unit 100 according to the invention are not limited to those of the above-described embodiment, and the present invention is susceptible to various modifications.

(1) In the above-described embodiment, the surface light source system 50 comprises the light source unit 100, the first lenticular lens sheet 14-1, the second lenticular lens sheet 14-2, the transparent sheet 15, the diffusing sheet 16, and the reflective polarizing sheet 17. The present invention is not limited to this. Various optical sheets can be added to and/or removed from the above surface light source system; for example, the reflective polarizing sheet 17 may be removed from the surface light source system 50.

(2) Further, in the above-described embodiment, the substrate layer 104 has, on its one side, the circuit layer 106 and the emission sources 101, as shown in FIG. 6. The present invention is not limited to this. The positions of the substrate layer 104, the circular layer 106, and the emission sources 101 may be changed, as needed.

Figure 9:
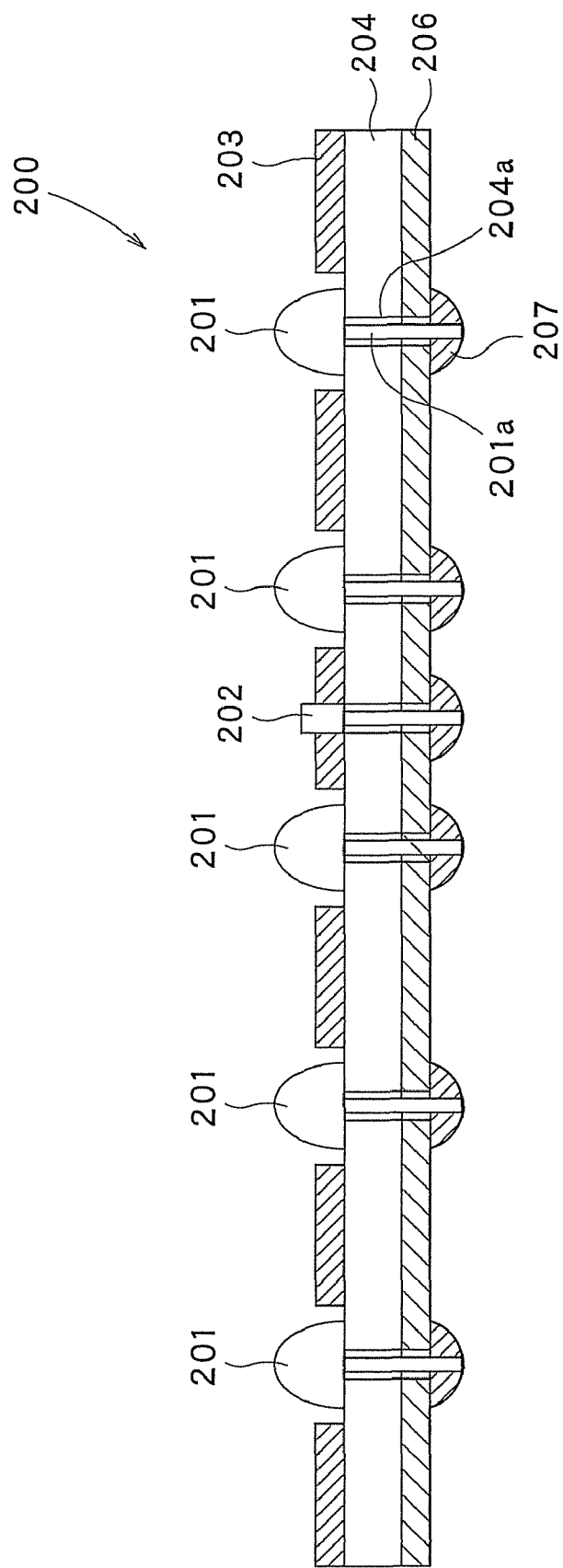
FIG. 9 corresponds to FIG. 5 and is a sectional view for explaining a modification of the lamination of the light source unit.

For example, a light source unit 200 can include a substrate layer 204, emission sources 201 supported on one side of the substrate layer 204, and a circuit layer 206 formed on the other side of the substrate layer 204, as shown in FIG. 9. Further, illuminance sensors 202 are placed on one surface of the substrate layer 204, and this surface of the substrate layer 204, excluding those portions of the surface on which the emission sources 201 and the illuminance sensors 202 are placed, is covered with a reflecting layer 203.

The emission sources 201 and the illuminance sensors 202 are through-hole mounted in the substrate layer 204 having the circuit layer 206, unlike those in the above-described embodiment. Specifically, leads 201a from the elements, or the like, are inserted into through-holes 204a made in the substrate layer 204 and are led to the circuit layer 206; the leads 201a are connected and fixed to the circuit layer 206 with solder 207. Although not shown in FIG. 9 in order to facilitate the understanding, an insulating layer may be formed on the substrate layer 204, if necessary. Further, the reflecting layer 203 can have the same structure as the structure of the diffuse-reflecting layer 103 in the above-described embodiment.

According to the light source unit 200 shown in FIG. 9, the emission sources 201 and the illuminance sensors 202 are of through-hole mount type. Therefore, the emission sources 201 and the illuminance sensors 202 can be successively mounted in the substrate layer 204 on which the circuit layer 206 has been formed and this is advantageous from the view-point of production efficiency. Further, since the emission sources can be made small in size, it is possible to obtain a surface light source system with a smaller thickness by densely mounting LEDs as the emission sources. Moreover, by using inexpensive emission sources whose output is low, the surface light source system can be provided at a low price.

(3) Furthermore, in the above-described embodiment, the emission sources 101 contain the emission sources 101B, 101G and 101R of three types that are different in the wavelength range of light they emit. The present invention is not limited to this. The emission sources can contain emission sources of two types that are different in the wavelength range of light they emit, or can contain emission sources of four types or more that are different in the wavelength range of light they emit.

Moreover, all the emission sources contained in the light source unit 100 may emit light in the same wavelength range. That is to say, the light emitted from the light source unit 100 may be of a single color. When the light source unit 100 shown in FIG. 5 contains emission sources of one type only, whether the relationships (5) to (8) hold or not is checked by employing, as the value of L in the relationships, the intervals $L_{HO}$ or $L_{VO}$ at which the emission sources are arranged (12.5 mm).

Furthermore, in the above embodiment, the emission sources 101 contain the emission sources 101B that emit blue light, the emission sources 101G that emit green light, and the emission sources 101R that emit red light. However, the light that the emission sources emit may be of colors other than blue, green and red. That is to say, the wavelength range and center wavelength of the light that the emission sources emit may be changed, as needed.

(4) In the aforementioned embodiment, the emission sources that are different in the wavelength range of light they emit time-divisionally emit light. The present invention is not limited to this. For example, all the emission sources may be always on.

(5) Furthermore, the light source unit 100 contains the illuminance sensors 102 in the above-described embodiment. The present invention is not limited to this, and the illuminance sensors may not be present in the light source unit 100.

(6) In the above embodiment, although the first lenticular lens sheet 14-1 and the second lenticular lens sheet 14-2 are laid in different directions, they 14-1 and 14-2 have the same structure. However, the structures of the two lenticular lens sheets 14-1 and 14-2 may be different from each other. For instance, the first lenticular lens sheet 14-1 and the second lenticular lens sheet 14-2 may be different from each other in the shape or size of their unit lenses, or in the intervals at which the unit lenses are arranged.

(7) Furthermore, in the aforementioned embodiment, the direction in which the unit lenses 141-1 in the first lenticular lens sheet 14-1 are arranged is in parallel with the horizontal direction, and the direction in which the unit lenses 141-2 in the second lenticular lens sheet 14-2 are arranged is in parallel with the vertical direction. The present invention is not limited to this and is susceptible with various modifications. Moreover, in the above embodiment, the direction (one direction) in which the unit lenses 141-1 in the first lenticular lens sheet 14-1 are arranged is perpendicular to the direction (other direction) in which the unit lenses 141-2 in the second lenticular lens sheet 14-2 are arranged. However, the present invention is not limited to this, and the two directions may be inclined to each other.

(8) Furthermore, in the above embodiment, each lenticular lens sheet 14-1, 14-2 has unit lenses of one type only that are arranged at regular intervals. The present invention is not limited to this. Each lenticular lens sheet 14-1, 14-2 can have unit lenses of two types or more that are arranged at regular intervals. In the case where the lenticular lens sheet has unit lenses of two types or more, it is preferred that the unit lens of each type fulfill the above relationships (5) to (8).

(9) Furthermore, in the above-described embodiment, the surface light source system has two lenticular lens sheets, the first lenticular lens sheet 14-1 in which the unit lenses 141-1 are arranged in one direction at regular intervals, and the second lenticular lens sheet 14-2 in which the unit lenses 141-2 are arranged in other direction at regular intervals. The present invention is not limited to this. One of the two lenticular lens sheets may be removed from the surface light source system so that the non-uniformity of luminance and the non-uniformity of color that are produced in one direction only is rectified. For example, in the case where a light source unit in which emission sources are arranged in the other direction at extremely short intervals is used, there is sometimes no need to rectify the non-uniformity of luminance and the non-uniformity of color that are produced in the other direction. Such a light source unit can eliminate the second lenticular lens sheet without increasing the non-uniformity of luminance and the non-uniformity of color. Moreover, the surface light source system can use three lenticular lens sheets or more.

Figure 10:
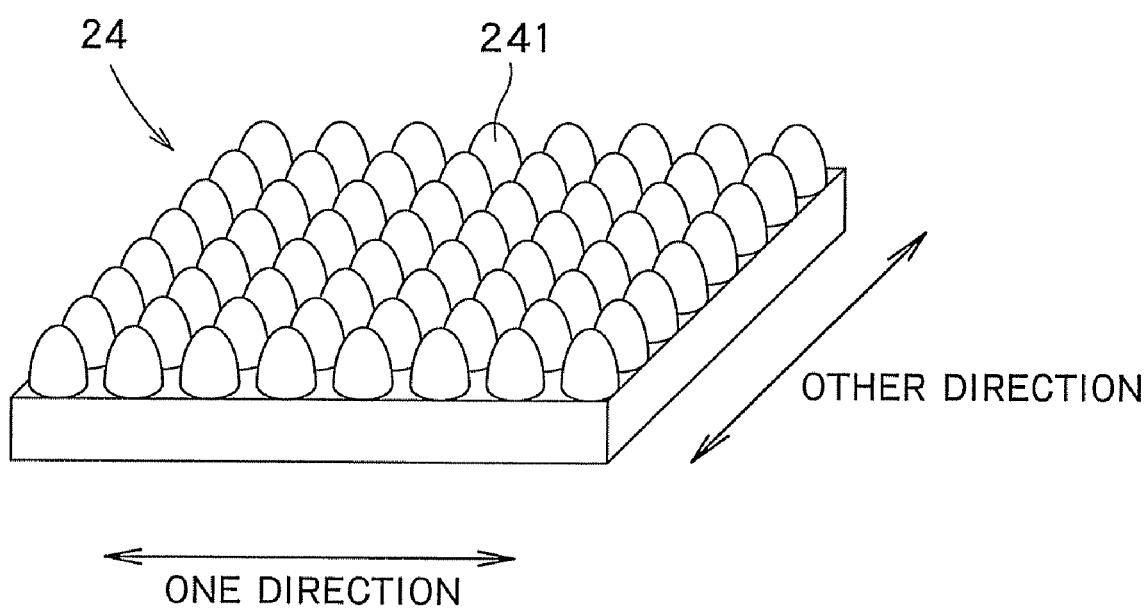
FIG. 10 is a perspective view showing a modification of the lenticular lens sheet that can be incorporated in the light source unit.

(10) Furthermore, in the aforementioned embodiment, the lenticular lens sheets having multiple unit lenses are used to rectify the non-uniformity of luminance and that of color. In the above embodiment, each unit lens in the lenticular lens sheet extends in the direction perpendicular to the direction in which the unit lenses are arranged, and the multiple unit lenses constitute a linear lenticular lens. The present invention is not limited to this. For example, the non-uniformity of luminance and the non-uniformity of color can be rectified by the use of a fly's eye lens sheet (fly's eye lens sheet, fly-eye lens sheet) 24 including multiple unit lenses 241 as shown in FIG. 10. The multiple unit lenses 241 in the fly's eye lens sheet 24 as shown in FIG. 10 are arranged in one direction parallel to a sheet plane of the fly's eye lens sheet 24 at approximately regular intervals, and, at the same time, are arranged in other direction at approximately regular intervals. The other direction is parallel to the sheet plane of the fly's eye lens sheet 24 and is different from the above one direction. The multiple unit lenses 241 illustrated in the figure constitute a so-called fly's eye lens. That is to say, a fly's eye lens sheet containing a fly's eye lens can be used in place of the lenticular lens sheet containing the linear lenticular lens in the above-described embodiment.

The counter of each unit lens 241 shown in FIG. 10 may be in the shape of a part of a spheroid, for example. In this case, in a cross section taken along the one direction or the other direction, the unit lens 241 is in a sectional shape of a part of an ellipsoid. Preferably, the major axis of the ellipsoid extends in the direction of the normal to the sheet plane of the fly's eye lens sheet 24. Further, it is preferred that the semi-major axis of this ellipsoid be not less than 2.5 times and not more than 5 times the semiminor axis of the ellipsoid. In this case, the cross section of the surface light source system, taken along the normal to the sheet plane of the fly's eye lens sheet 24 and along the one or other direction is the same as the cross section of the surface light source system in the above-described embodiment shown in FIG. 7 or 8. It is preferred that the relationships (5) to (8) are met in the cross section of the unit lens 241 taken along the one direction, as well as in the cross section of the unit lens 241 taken along the other direction.

The fly's eye lens sheet 24 illustrated in FIG. 10 has the unit lenses 241 of one type only. The present invention is not limited to this, and the fly's eye lens sheet 24 can have unit lenses of two types or more. When the fly's eye lens sheet 24 has unit lenses of two types or more, it is preferred that the unit lens of each type fulfil the above relationships (5) to (8).

Furthermore, like in the above-described embodiment, the light source unit can contain emission sources of two types or more. In this case, when prevention of non-uniformity of not only luminance but also color is taken into consideration, it is preferred that the above relationships (5) to (8) hold, provided that the intervals at which the emission sources of each type are arranged (the intervals at which the emission sources that emit light in one wavelength range) is employed as the value of L in the relationships.

(11) Furthermore, the scattering layer contains white beads in the above embodiment. The present invention is not limited to this, and the scattering layer can, in place of the white beads, contain styrene beads, or both styrene beads and silicone beads, for example.

(12) There have been described several modifications of the aforementioned embodiment of the present invention. It is a matter of course that two or more of the modifications can be employed in combination, as needed.

The invention claimed is:

1. A direct-type surface light source system comprising:
a first lenticular lens sheet having multiple unit lenses, each of the unit lenses projecting on the light-exiting side;
a second lenticular lens sheet having multiple unit lenses, each of the unit lenses projecting on the light-exiting side; and
a light source unit having emission sources, the emission sources being capable of being divided into two types or more according to wavelength ranges of light they emit,
wherein the unit lenses in the first lenticular lens sheet are arranged in one direction parallel to a sheet plane of the first lenticular lens sheet at approximately regular intervals,
wherein the unit lenses in the second lenticular lens sheet are arranged in other direction at approximately regular intervals, the other direction being parallel to a sheet plane of the second lenticular lens sheet and being perpendicular to the one direction,
wherein the emission sources are arranged on a plane parallel to the sheet plane of the first lenticular lens sheet,
wherein emission sources of each type are arranged in the one direction at approximately regular intervals,
wherein intervals at which respective emission sources of two types or more arranged in the one direction are nearly the same in length, and
wherein a length L of the intervals at which the emission sources of each type are arranged in the one direction, a distance d between the light source unit and the first lenticular lens sheet, measured along a normal to the sheet plane of the first lenticular lens sheet, an angle θ between the normal and a tangent line to an edge, in the one direction, of the unit lenses in a cross section taken along the one direction and along the normal, and a refractive index n of a material for the unit lenses fulfill the following relationship:

$$\cos^{-1}(n \times \cos(\phi+\theta)) \leq \theta$$

wherein $\phi = \sin^{-1}(\sin(\tan^{-1}(L/2d))/n)$,
or $$n \times \cos(\phi+\theta) > 1$$

wherein $\phi = \sin^{-1}(\sin(\tan^{-1}(L/2d))/n)$.

2. The surface light source system according to claim 1,
wherein the emission sources of each type are also arranged in the other direction at approximately regular intervals,
wherein intervals at which the respective emission sources of two types or more arranged in the other direction are nearly the same in length,
wherein the light source unit at least has: first emission sources having a first emission center wavelength; second emission sources having a second emission center wavelength, the second emission center wavelength being longer than the first emission center wavelength; and third emission sources having a third emission center wavelength, the third emission center wavelength being longer than the second emission center wavelength, and
wherein a shortest distance between two of the second emission sources, measured along the sheet plane of the lenticular lens sheet, is shorter than a length of intervals at which the second emission sources are arranged in the one direction and shorter than a length of intervals at which the second emission sources are arranged in the other direction.

3. The surface light source system according to claim 1:
wherein the first lenticular lens sheet has a scattering layer that scatters light; and
wherein the scattering layer is formed such that the scattering layer extends along a contours of the unit lenses so as to form a light-exiting-side-surface of the first lenticular lens sheet.

4. The surface light source system according to claim 3,
wherein a length p of the intervals at which the unit lenses in the first lenticular lens sheet are arranged in the one direction and a thickness t of the scattering layer fulfill the following relationship:

$$p/10 \leq t \leq p/3.$$

5. The surface light source system according to claim 1:
wherein the emission sources of each type are also arranged in the other direction at approximately regular intervals;
wherein intervals at which the respective emission sources of two types or more arranged in the other direction are nearly the same in length; and
wherein a length $L_2$ of the intervals at which the emission sources of each type are arranged in the other direction, a distance $d_2$ between the light source unit and the second lenticular lens sheet, measured along the normal to the sheet plane of the first lenticular lens sheet, and an angle $\theta_2$ between the normal and a tangent line to an edge, in other direction, of the unit lenses in the second lenticular lens sheet in a cross section taken along the other direction and along the normal, and a refractive index $n_2$ of a material for the unit lenses in the second lenticular lens sheet fulfill the following relationship:

$$\cos^{-1}(n_2 \times \cos(\phi_2+\theta_2)) \leq \theta_2$$

wherein $\phi_2 = \sin^{-1}(\sin(\tan^{-1}(L_2/2d_2))/n_2)$,
or $$n_2 \times \cos(\phi_2+\theta_2) > 1$$

wherein $\phi_2 = \sin^{-1}(\sin(\tan^{-1}(L_2/2d_2))/n_2)$.

6. A direct-type surface light source system comprising:
a lenticular lens sheet having multiple unit lenses, each of the unit lenses projecting on the light-exiting side; and
a light source unit having emission sources, the emission sources being capable of being divided into two types or more according to wavelength ranges of light they emit, wherein the unit lenses in the lenticular lens sheet are arranged in one direction parallel to a sheet plane of the lenticular lens sheet at approximately regular intervals, wherein the emission sources are arranged on a plane parallel to the sheet plane of the lenticular lens sheet, wherein emission sources of each type are arranged in the one direction at approximately regular intervals, wherein intervals at which respective emission sources of two types or more arranged in the one direction are nearly the same in length, and wherein a length L of the intervals at which the emission sources of each type are arranged in the one direction, a distance d between the light source unit and the lenticular lens sheet, measured along a normal to the sheet plane of the lenticular lens sheet, an angle θ between the normal and a tangent line to an edge, in the one direction, of the unit lens in a cross section taken along the one direction and along the normal, and a refractive index n of a material for the unit lenses fulfill the following relationship:

$$\cos^{-1}(n \times \cos(\phi + \theta)) \leq \theta$$

wherein $\phi = \sin^{-1}(\sin(\tan^{-1}(L/2d))/n)$, or $$n \times \cos(\phi + \theta) > 1$$

wherein $\phi = \sin^{-1}(\sin(\tan^{-1}(L/2d))/n)$.

7. The surface light source system according to claim 6, wherein the emission sources of each type are also arranged in the other direction at approximately regular intervals, wherein intervals at which the respective emission sources of two types or more arranged in the other direction are nearly the same in length, wherein the light source unit at least has: first emission sources having a first emission center wavelength; second emission sources having a second emission center wavelength, the second emission center wavelength being longer than the first emission center wavelength; and third emission sources having a third emission center wavelength, the third emission center wavelength being longer than the second emission center wavelength, and wherein a shortest distance between two of the second emission sources, measured along the sheet plane of the lenticular lens sheet, is shorter than a length of intervals at which the second emission sources are arranged in the one direction and shorter than a length of intervals at which the second emission sources are arranged in the other direction.

8. The surface light source system according to claim 6:
wherein the lenticular lens sheet has a scattering layer that scatters light; and
wherein the scattering layer is formed such that the scattering layer extends along a contours of the unit lenses so as to form a light-exiting-side-surface of the lenticular lens sheet.

9. The surface light source system according to claim 8, wherein a length p of the intervals at which the unit lenses are arranged in the one direction and a thickness t of the scattering layer fulfill the following relationship:

$$p/10 \leq t \leq p/3.$$

10. A direct-type surface light source system comprising:
a first lenticular lens sheet having multiple unit lenses, each of the unit lenses projecting on the light-exiting side;
a second lenticular lens sheet having multiple unit lenses, each of the unit lenses projecting on the light-exiting side; and
a light source unit having emission sources, the emission sources being capable of being divided into two types or more according to wavelength ranges of light they emit, wherein the unit lenses in the first lenticular lens sheet are arranged in one direction parallel to a sheet plane of the first lenticular lens sheet at approximately regular intervals, wherein the unit lenses in the second lenticular lens sheet are arranged in other direction at approximately regular intervals, the other direction being parallel to a sheet plane of the second lenticular lens sheet and being perpendicular to the one direction, wherein the emission sources are arranged on a plane parallel to the sheet plane of the first lenticular lens sheet, wherein emission sources of each type are arranged in the one direction at approximately regular intervals, wherein intervals at which respective emission sources of two types or more arranged in the one direction are the same in length, wherein the emission sources of each type are also arranged in the other direction at approximately regular intervals, wherein intervals at which the respective emission sources of two types or more arranged in the other direction are the same in length, wherein the light source unit at least has: first emission sources having a first emission center wavelength; second emission sources having a second emission center wavelength, the second emission center wavelength being longer than the first emission center wavelength; and third emission sources having a third emission center wavelength, the third emission center wavelength being longer than the second emission center wavelength, and wherein a shortest distance between two of the second emission sources, measured along the sheet plane of the lenticular lens sheet, is shorter than a length of intervals at which the second emission sources are arranged in the one direction and shorter than a length of intervals at which the second emission sources are arranged in the other direction.

11. The surface light source system according to claim 10:
wherein the first lenticular lens sheet has a scattering layer that scatters light; and
wherein the scattering layer is formed such that the scattering layer extends along a contours of the unit lenses so as to form a light-exiting-side-surface of the first lenticular lens sheet.

12. The surface light source system according to claim 11, wherein a length p of the intervals at which the unit lenses in the first lenticular lens sheet are arranged in the one direction and a thickness t of the scattering layer fulfill the following relationship:

$$p/10 \leq t \leq p/3.$$

13. The surface light source system according to claim 10:
wherein a length L of the intervals at which the emission sources of each type are arranged in the one direction, a distance d between the light source unit and the first lenticular lens sheet, measured along a normal to the sheet plane of the first lenticular lens sheet, an angle θ between the normal and a tangent line to an edge, in the one direction, of the unit lenses in a cross section taken along the one direction and along the normal, and a refractive index n of a material for the unit lenses fulfill the following relationship:

$$\cos^{-1}(n \times \cos(\phi+\theta)) \leq \theta$$

wherein $\phi = \sin^{-1}(\sin(\tan^{-1}(L/2d))/n)$, or $$n \times \cos(\phi+\theta) > 1$$

wherein $\phi = \sin^{-1}(\sin(\tan^{-1}(L/2d))/n)$; and,
wherein a length $L_2$ of the intervals at which the emission sources of each type are arranged in the other direction, a distance $d_2$ between the light source unit and the second lenticular lens sheet, measured along the normal to the sheet plane of the first lenticular lens sheet, and an angle $\theta_2$ between the normal and a tangent line to an edge, in other direction, of the unit lenses in the second lenticular lens sheet in a cross section taken along the other direction and along the normal, and a refractive index $n_2$ of a material for the unit lenses in the second lenticular lens sheet fulfill the following relationship:

$$\cos^{-1}(n_2 \times \cos(\phi_2+\theta_2)) \leq \theta_2$$

wherein $\phi_2 = \sin^{-1}(\sin(\tan^{-1}(L_2/2d_2))/n_2)$, or $$n_2 \times \cos(\phi_2+\theta_2) > 1$$

wherein $\phi_2 = \sin^{-1}(\sin(\tan^{-1}(L_2/2d_2))/n_2)$.

14. A direct-type surface light source system comprising:
a lenticular lens sheet having multiple unit lenses, each of the unit lenses projecting on the light-exiting side; and
a light source unit having emission sources, the emission sources being capable of being divided into two types or more according to wavelength ranges of light they emit,
wherein the unit lenses in the lenticular lens sheet are arranged in one direction parallel to a sheet plane of the lenticular lens sheet at approximately regular intervals,
wherein the emission sources are arranged on a plane parallel to the sheet plane of the lenticular lens sheet,
wherein emission sources of each type are arranged in the one direction at approximately regular intervals,
wherein intervals at which respective emission sources of two types or more arranged in the one direction are the same in length,
wherein the emission sources of each type are also arranged in the other direction at approximately regular intervals,
wherein intervals at which the respective emission sources of two types or more arranged in the other direction are the same in length,
wherein the light source unit at least has: first emission sources having a first emission center wavelength; second emission sources having a second emission center wavelength, the second emission center wavelength being longer than the first emission center wavelength; and third emission sources having a third emission center wavelength, the third emission center wavelength being longer than the second emission center wavelength, and
wherein a shortest distance between two of the second emission sources, measured along the sheet plane of the lenticular lens sheet, is shorter than a length of intervals at which the second emission sources are arranged in the one direction and shorter than a length of intervals at which the second emission sources are arranged in the other direction.

15. The surface light source system according to claim 14:
wherein the first lenticular lens sheet has a scattering layer that scatters light; and
wherein the scattering layer is formed such that the scattering layer extends along a contours of the unit lenses so as to form a light-exiting-side-surface of the first lenticular lens sheet.

16. The surface light source system according to claim 15, wherein a length p of the intervals at which the unit lenses in the first lenticular lens sheet are arranged in the one direction and a thickness t of the scattering layer fulfill the following relationship:

$$p/10 \leq t \leq p/3.$$

* * * * *